US007197550B2

(12) United States Patent  (10) Patent No.: US 7,197,550 B2
Cheline et al.  (45) Date of Patent: Mar. 27, 2007

(54) AUTOMATED CONFIGURATION OF A VIRTUAL PRIVATE NETWORK

(75) Inventors: Douglas A. Cheline, San Jose, CA (US); Michael Ma, Campbell, CA (US); Ye Zhang, Milpitas, CA (US); Lester J. Chong, San Jose, CA (US)

(73) Assignee: The DirecTV Group, Inc., El Segundo, CA (US)

(*) Notice: Subject to any disclaimer, the term of this patent is extended or adjusted under 35 U.S.C. 154(b) by 751 days.

(21) Appl. No.: 09/938,443

(22) Filed: Aug. 23, 2001

(65) Prior Publication Data

US 2003/0041136 A1 Feb. 27, 2003

(51) Int. Cl.
*G06F 15/16* (2006.01)

(52) U.S. Cl. ............... 709/223; 709/220; 370/252; 379/93.01

(58) Field of Classification Search ........ 709/221–227, 709/220, 200–202; 370/229, 254, 464, 401, 370/465, 252; 713/1, 150, 155, 182, 189; 379/93.01

See application file for complete search history.

(56) References Cited

U.S. PATENT DOCUMENTS

| 4,200,770 | A | 4/1980 | Hellman et al. ............... 178/22 |
| 5,307,402 | A * | 4/1994 | Cooper .................... 379/93.32 |
| 5,777,989 | A | 7/1998 | McGarvey |
| 5,794,230 | A | 8/1998 | Horadan et al. ............. 707/102 |
| 6,009,459 | A | 12/1999 | Belfiore et al. ............. 709/203 |
| 6,108,330 | A | 8/2000 | Bhatia et al. |
| 6,118,768 | A | 9/2000 | Bhatia et al. |
| 6,145,003 | A | 11/2000 | Sanu et al. ................ 709/225 |
| 6,298,308 | B1 | 10/2001 | Reid et al. |
| 6,377,571 | B1 | 4/2002 | Tai |
| 6,523,027 | B1 * | 2/2003 | Underwood .................... 707/4 |
| 6,538,996 | B1 * | 3/2003 | West et al. ................. 370/238 |
| 6,560,634 | B1 | 5/2003 | Broadhurst |
| 6,601,233 | B1 * | 7/2003 | Underwood ................. 717/102 |
| 6,609,128 | B1 * | 8/2003 | Underwood ................. 707/10 |
| 6,609,153 | B1 * | 8/2003 | Salkewicz .................... 709/223 |

(Continued)

OTHER PUBLICATIONS

Author Unknown; "Lucent Security Management Server: Carrier-Grade IP Services Management Solution"; Lucent Technologies; Published May 2001.*

(Continued)

*Primary Examiner*—Moustafa M. Meky
(74) *Attorney, Agent, or Firm*—Georgann S. Grunebach

(57) ABSTRACT

Data is received by a service provider that is indicative of a selected server-side system and a selected client-side system between which a VPN is to be established. Security settings are then automatically determined for the client-side system based at least partially on the data. The security settings are preferably public and private keys and/or a Digital Certificate. VPN configuration details, including the security settings, are then automatically transmitted to the client-side system. The client side system then uses the configuration details to automatically configure itself to establish a secure VPN tunnel between the server-side system and itself. VPN configuration details may also be automatically transmitted to a VPN concentrator within the server-side system. A Virtual Private Network tunnel is subsequently established between the client-side system and the server-side system, and the tunnel's operation verified. A computer program product for configuring a VPN system is also provided.

27 Claims, 13 Drawing Sheets

U.S. PATENT DOCUMENTS

| | | | | |
|---|---|---|---|---|
| 6,633,878 B1* | 10/2003 | Underwood | ................ | 707/100 |
| 6,662,221 B1* | 12/2003 | Gonda et al. | ............... | 709/223 |
| 6,671,729 B1* | 12/2003 | Gordon et al. | ............. | 709/227 |
| 6,704,873 B1* | 3/2004 | Underwood | ................ | 713/201 |
| 6,711,138 B1* | 3/2004 | Pai et al. | .................... | 370/257 |
| 6,718,535 B1* | 4/2004 | Underwood | ................ | 717/101 |
| 6,760,746 B1 | 7/2004 | Schneider | | |
| 6,765,591 B2* | 7/2004 | Poisson et al. | ............. | 715/735 |
| 6,765,881 B1* | 7/2004 | Rajakarunanayake | ....... | 370/256 |
| 6,871,347 B2 | 3/2005 | Hay | | |
| 2001/0036192 A1* | 11/2001 | Chiles et al. | ............... | 370/401 |
| 2002/0010798 A1 | 1/2002 | Ben-Shaul et al. | | |
| 2002/0026503 A1* | 2/2002 | Bendinelli et al. | .......... | 709/220 |
| 2002/0027915 A1 | 3/2002 | Foti et al. | | |
| 2002/0032544 A1 | 3/2002 | Reid et al. | | |
| 2002/0118671 A1* | 8/2002 | Staples et al. | .............. | 370/352 |
| 2002/0154623 A1 | 10/2002 | Hundemer | | |
| 2002/0169988 A1 | 11/2002 | Vandergeest et al. | | |
| 2002/0178361 A1* | 11/2002 | Genty et al. | ................ | 713/175 |
| 2003/0009592 A1 | 1/2003 | Stahura | | |
| 2003/0014541 A1 | 1/2003 | Poeluev | | |
| 2003/0039268 A1 | 2/2003 | Chong et al. | | |
| 2004/0039798 A1 | 2/2004 | Hotz et al. | | |
| 2004/0123153 A1* | 6/2004 | Wright et al. | ............... | 713/201 |

OTHER PUBLICATIONS

Microsoft; Windows 2000 DNS White Paper; Oct. 1999.

Kangasharju et al.; "A Replicated Architecture for the Domain Name System"; Mar. 2000; INFOCOM 2000; Nineteenth Annual Joint Conference of the IEEE Computer and Communications Societies Proceedings; vol. 2; pp. 660-669.

* cited by examiner

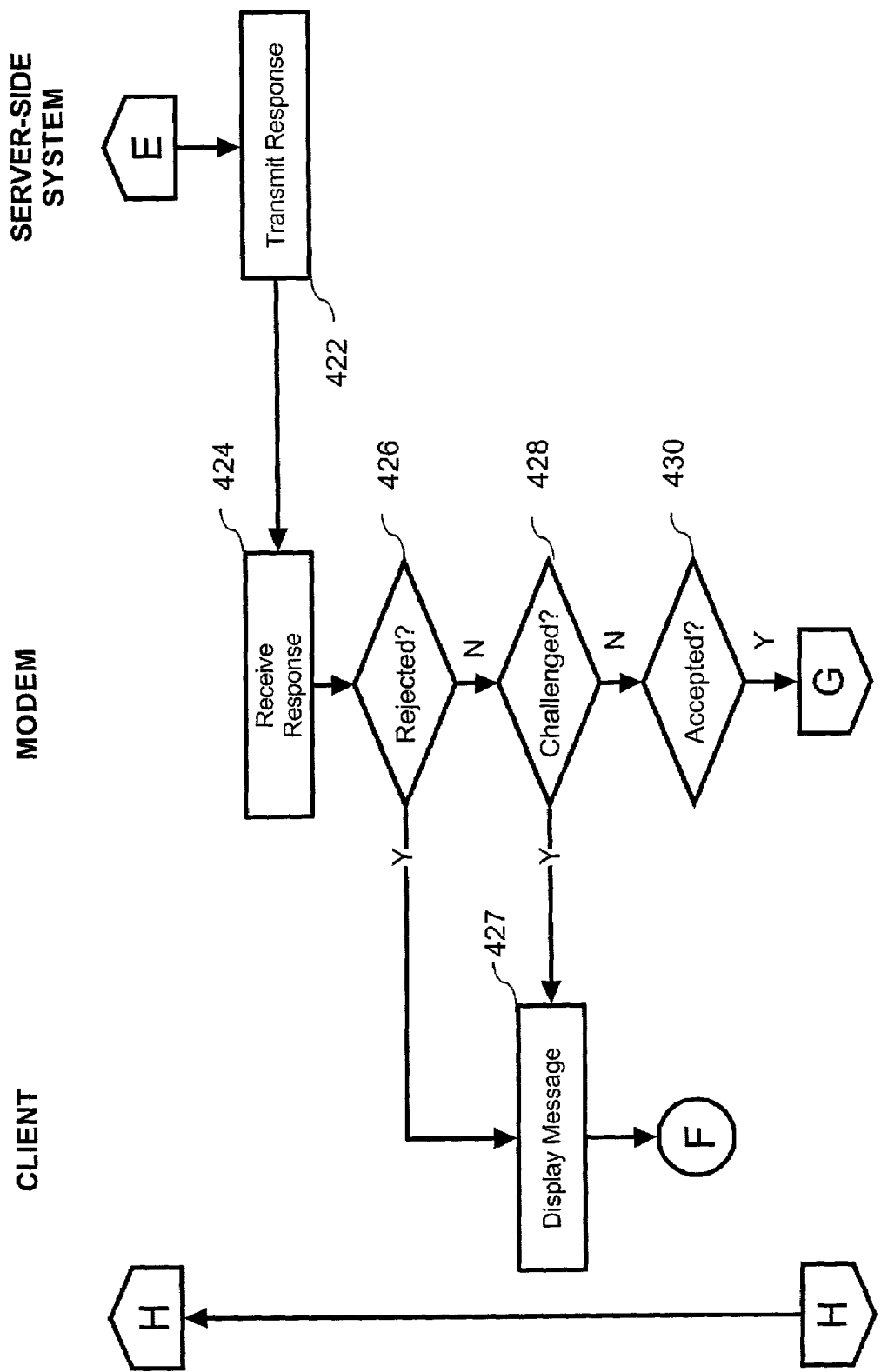

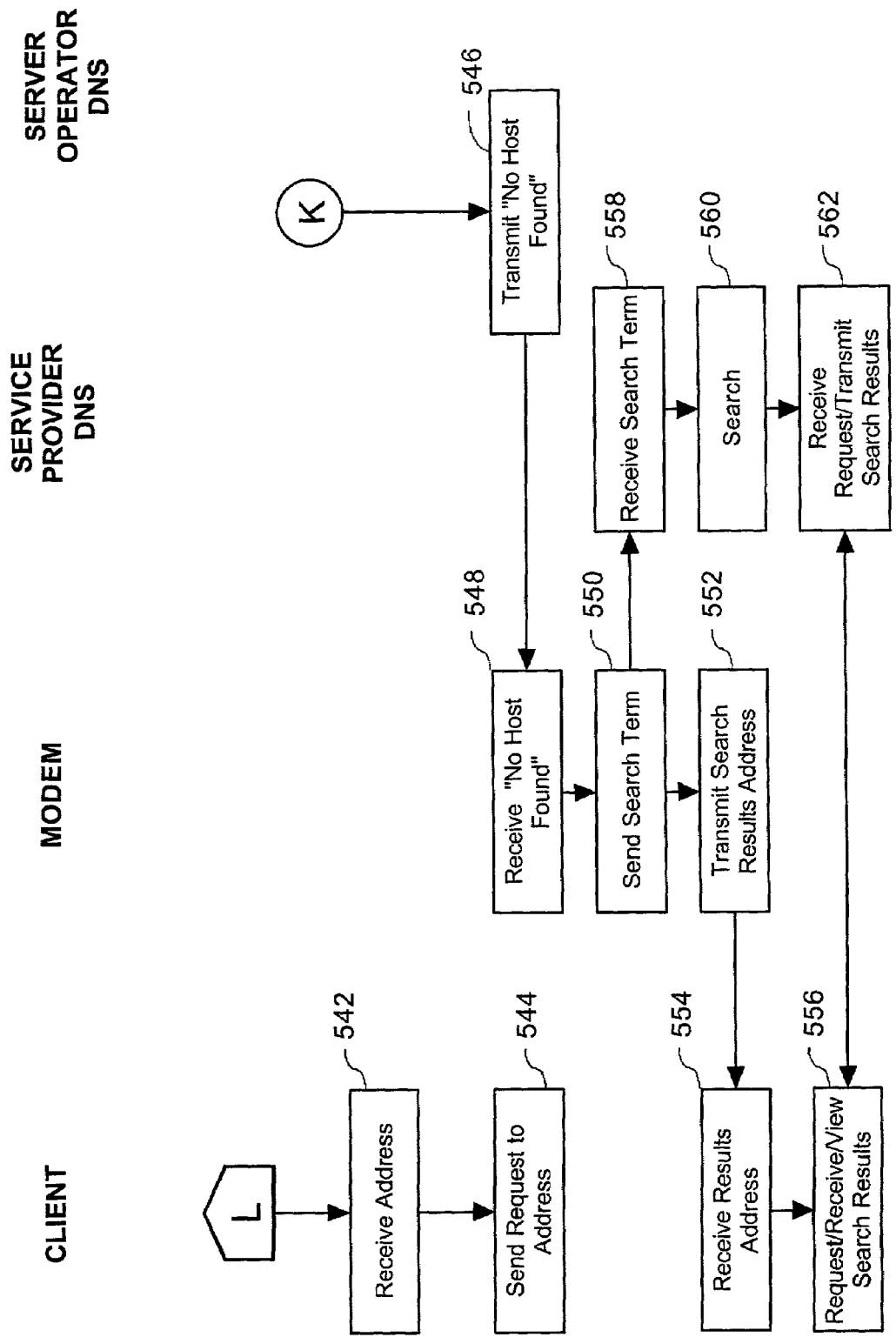

AUTOMATED CONFIGURATION OF A VIRTUAL PRIVATE NETWORK

FIELD OF THE INVENTION

The present invention relates generally to communication networks, and particularly to a Virtual Private Network (VPN) system and a computer implemented method for remotely configuring the VPN between a client-side system and a server-side system.

BACKGROUND OF THE INVENTION

Communication networks can generally be characterized as either private or public networks. In pure private networks, communications between multiple computers, located at different locations, occur via a permanent or switched network, such as a telephone network. The communicating computers typically connect directly to each other via a dialup or leased line connection, thereby emulating their physical attachment to one another. This type of network is usually considered private because the communication signals travel directly from one computer to another.

Communication over packet networks, such as the Internet, is typically not private, as the network cannot guarantee packet delivery. Such networks allow packets to be injected into, or ejected out of, their circuits indiscriminately, and/or analyzed while in transit. For normal communication this poses no real threat. However, to keep sensitive data communicated on such circuits private, the packets flowing on the circuit must be encrypted so that injected packets can be recognized and discarded to keep unauthorized parties from reading and analyzing data. These private circuits are called "tunnels."

A virtual private network (VPN) is a private data network that makes use of tunnels to maintain privacy when communicating over a public telecommunication infrastructure, such as the Internet. The purpose of VPNs is to give server operators, such as corporations, the same capabilities that they would have if they had a private permanent or switched network. VPNs also cost much less to operate than other private networks, as they use a shared public infrastructure rather than a private one.

Data communicated on a VPN is encrypted before being sent through the public network and decrypted at the receiving end. An additional level of security involves encrypting not only the data but also the originating and receiving network addresses. Server operators today are looking at using VPNs for both extranets and wide-area intranets.

Setting up a VPN, however, is a complex task. Corporations providing VPN connectivity to their employees, typically, must go through a number of inefficient steps before a VPN network can be established between the server operator's server and an employee's client computer. First, the server operator must set up the individual's account on the server-side. To accomplish this, a VPN system administrator at the server-side, manually enters the configuration data for the new client, determines the necessary security settings, inputs the security settings into an authentication server, and configures the server-side firewall so that it will accept incoming packets from the new client. Second, the VPN system administrator has to configure the client-side by manually entering the configuration data for the new server, determining the necessary security settings, inputting the security settings, and configuring the client-side firewall so that it will accept incoming packets from the new server. No known current means exists for automatically configuring the client and server for VPN communication.

Another drawback with current systems that establish VPN communication between a client and a server, is that they typically do not allow multiple clients coupled to the same client-side modem to establish multiple VPN communication tunnels over the same modem. For example, say husband (H) telecommutes with his office ($O_H$) using VPN over his Digital Subscriber Line (DSL) modem in his home. Wife (W) would also like to telecommute with her office ($O_W$) a corporation distinct from $O_H$. The standard means for establishing two VPN tunnels is to provide separate modems and telephone lines to ensure that the communication between H and $O_H$ and W and $O_W$, remains secure and private. This system is both inefficient and costly as two sets of client-side modems, two telephone lines, and two separate Internet connections are required. A need therefore exists for a means to allow multiple clients to establish multiple VPN tunnels over the same client-side modem.

Yet another drawback with existing VPN systems is that of host name resolution. Users using a file manager, such as WINDOWS EXPLORER™, or an Internet browser, such as MICROSOFT'S INTERNET EXPLORER™, in conjunction with more recent versions of MICROSOFT WINDOWS™, can enter a string of text into a text box on the Graphical User Interface (GUI) of these applications. Depending on the particular application used, this text box may be called, among other things, a destination field, location field, address field, or URL field. Typically, users enter Uniform Resource Locators (URLs) into the text box. However, a folder or directory name anywhere on the network that the client computer is connected to, may also be entered into the text box. In fact, any string of text may be entered into the text box. A URL is a compact string representation for a resource that is available on the Internet. In general, a URL is written as follows:

[<scheme>:<scheme-specific-part>]. The <scheme> portion of the URL identifies which scheme is being utilized. Among the better known schemes are File Transfer Protocol (FTP), Hypertext Transfer Protocol (HTTP), the Gopher Protocol, Wide Area Information Servers (WAIS), USENET News Protocol (News), and the Prospero Directory Service (Prospero). Once the string of text has been entered into the address field and either the "enter" key depressed or the "Go" button clicked, the local client computer attempts to resolve what to display.

If the text entered is a URL, i.e., prefixed by ftp://, http://, www, etc., the client computer first searches its local cache to see if Web content, such as a Web page, associated with the URL is present on the local client computer. If it is, the associated Web content is displayed to the user. If it is not, the client computer sends out a DNS request to a DNS server dictated by the user's Internet settings, where the DNS (Domain Name System) resolves Internet domain names, such as www.company.com, into IP (Internet Protocol) addresses, such as 204.0.8.51. A DNS list of domain names and IP addresses are distributed throughout the Internet in a hierarchy of authority.

The DNS server then searches its DNS tables to locate an IP address associated with the URL. If an IP address is located, the IP address is returned to the local computer which then sends a request for the Web page (or other content, such as a file) to that IP address. If an associated IP address is not found on the DNS server, the DNS server returns a "page not found" response to the client computer.

If the text entered is a directory or folder name on the client computer, or within the network that the client computer forms a part of, and if such a directory or folder name is located, the contents of that folder or directory is displayed. If the text entered is not a directory or folder name on the client computer, or within the network that the client computer forms a part of, the text is sent to a designated search engine which conducts a search of the Internet using the text as the search term. A most likely Web page and/or a list of results located is subsequently displayed to the user. A description of this process can be found in U.S. Pat. No. 6,009,459, which is incorporated herein by reference. Selection of the search engine, most likely Web page, and the list of results is controlled by the manufacturer of the application and cannot be altered by the user.

The above mentioned text entry system works sufficiently well for a single client computer connected to the Internet. However, when using a VPN, multiple DNS servers and/or folders or directories with the same name, may coexist on the VPN. Therefore, the client computer, or its modem, has no way of intelligently determining which cache to search, which DNS server to send the request to, which search engine to use, and/or which directory or folder's contents to display. A need, therefore, exists to manage and prioritize requests entered into the text box of the above mentioned applications.

In light of the above, a less complex, less efficient, and less costly method for configuring a VPN would be highly desirable. Particularly where the resources of a service provider can be redirected to areas other than manually configuring the system. Furthermore, a VPN system that allows multiple clients coupled to the same client-side modem to establish multiple VPN communication tunnels over the same modem, would also be desirable. In addition, any advancement in host name resolution that addresses the abovementioned drawbacks would be welcomed.

SUMMARY OF THE INVENTION

According to the invention there is also provided a remotely configurable Virtual Private Network (VPN). The VPN preferably includes a client-side network, a server-side network, and a service provider network. The client-side network preferably includes a DSL (Digital Subscriber Line) modem that communicates with the Internet, and at least one client computer electrically coupled to the modem. The server-side network preferably includes a VPN concentrator communicates with the Internet, and at least one server electrically coupled to the VPN concentrator. The service provider network preferably includes a security generator for determining security settings used to secure VPN communication between the client computer and the server, a VPN synchronizer for automatically configuring the modem with the security settings, and a modem synchronizer for configuring the modem with the security settings.

Further according to the invention there is provided a computer implemented method for remotely configuring a Virtual Private Network (VPN) between a client-side system and a server-side system. Data is received by a service provider that is indicative of a selected server-side system and a selected client-side system between which a VPN is to be established. This data is preferably supplied by a VPN administrator via an administration Website. Security settings are then automatically determined for the client-side system based at least partially on the data. The security settings preferably include public and private keys and/or a Digital Certificate. VPN configuration details, including the security settings, are then automatically transmitted to the client-side system. The client side system them uses the configuration details to automatically configure itself to establish a secure VPN tunnel between the server-side system and itself. VPN configuration details may also be automatically transmitted to a VPN concentrator within the server-side system. A Virtual Private Network tunnel is subsequently established between the client-side system and the server-side system, and the tunnel's operation verified. A computer program product for configuring a VPN system is also provided.

Using the above, a less complex, less efficient, and less costly method for configuring a VPN is provided, thereby allowing the resources of a service provider to be redirected to areas other than manually configuring the system.

BRIEF DESCRIPTION OF THE DRAWINGS

Additional objects and features of the invention will be more readily apparent from the following detailed description and appended claims when taken in conjunction with the drawings, in which:

FIGS. 4A–C are flow charts of a method for establishing multiple VPN tunnels over a single modem according to an embodiment of the invention;

FIGS. 5A–C are flow charts of a method for automatically resolving host names in a VPN according to an embodiment of the invention.

Like reference numerals refer to corresponding parts throughout the several views of the drawings.

DESCRIPTION OF THE PREFERRED EMBODIMENTS

The VPN disclosed herein makes use of a public telecommunication infrastructure and maintains secure communication through the use of encrypted tunneling protocol and security procedures. From the user's perspective, the connection appears to be a private network connecting the user's computer to a server operator's server-side system despite the fact that all communication is occurring over the public telecommunication infrastructure.

A preferred VPN meets the following general requirements for network security and access control. Information transferred over the VPN is encrypted with strong encryption algorithms, thereby ensuring confidentiality. An unauthorized party without the knowledge of the sending and receiving parties cannot secretly modify the transferred information, thus safeguarding the integrity of the communication. Furthermore, before information is transferred between parties, both sides need to authenticate themselves to each other by using Digital Certificates. Additionally, a home user will only be able to access the VPN and transfer or receive information from the server operator system after the user provides a username, password and optionally a tokencode and is authenticated by the server operator's authentication server.

Furthermore, the VPN system disclosed herein is relatively easy for telecommuting users to install and maintain, as the client VPN software resides on the user's modem instead of on the user's client computer. This alleviates drawbacks associated with software interoperability and maintenance issues on the user's client computer. Also, server operator VPN system administrators can securely connect to easy to use web interfaces to manage their entire VPN system.

Figure 1:
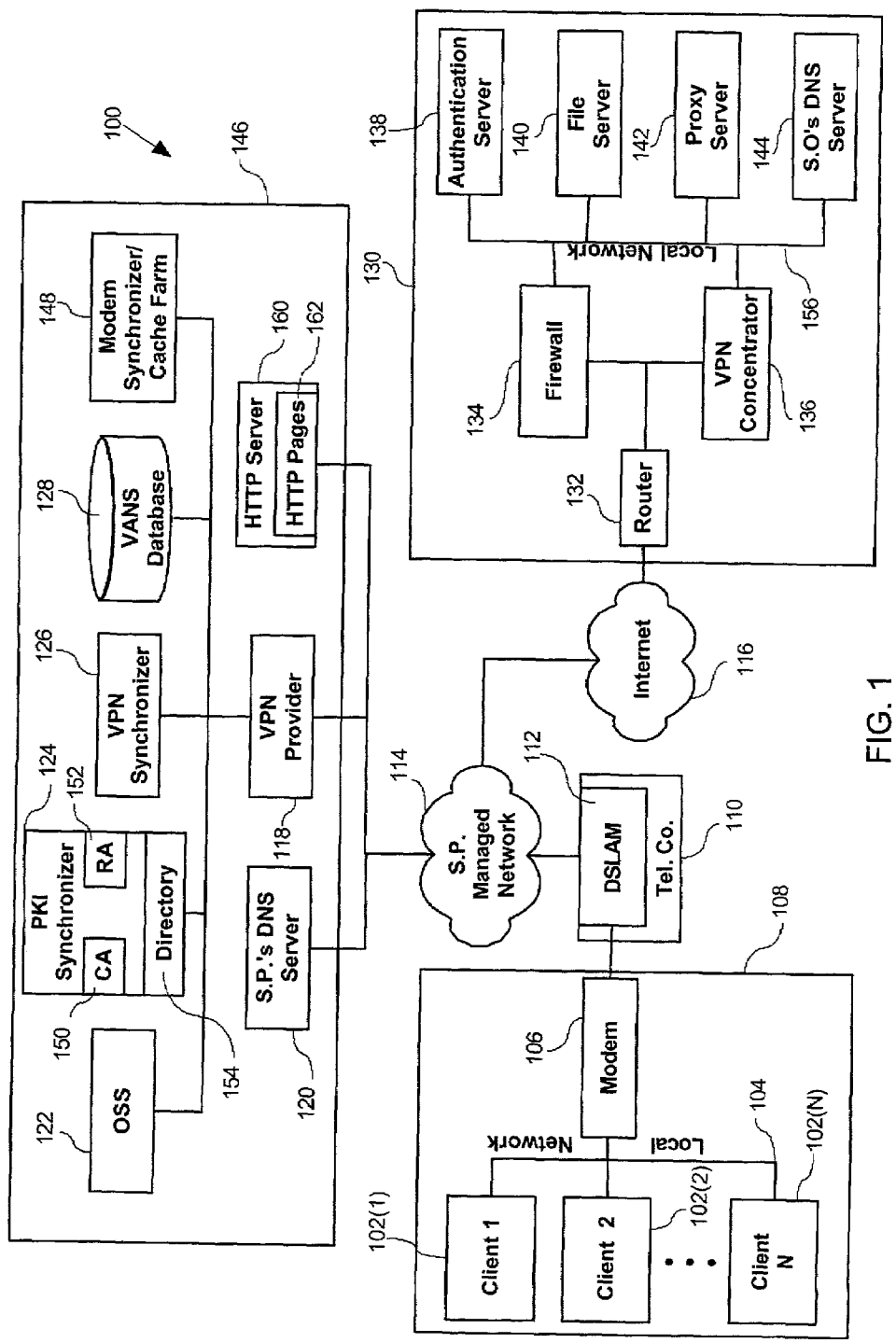
FIG. 1 is a block diagram of the system architecture according to an embodiment of the present invention.

FIG. 1 is a block diagram of the system architecture 100, according to an embodiment of the present invention. A client-side system 108 connects to both a service provider system 146, and a server-side system 130, where the client-side system 108, service provider system 146, and server-side system 130 are preferably computer networks comprising one or more computing devices coupled together. In a preferred embodiment, the client-side system 108 comprises one or more computers coupled to a modem.

The client-side system 108 is preferably operated by one or more users who desire to connect to the server-side system 130 via a VPN. The server-side system is preferably operated by a server operator, such that the user can connect or telecommute via a VPN with the server-side system 130 as if he or she was locally connected to it. A service provider preferably operates and controls the VPN and the service provider system 146. It should be understood that the service provider, user, and server operator may be distinct individuals, a group of individuals, a legal entity, or the like. Furthermore, although in practice, the service provider, the user, and/or the server operator are separate entities, this is not required.

The client-side system 108 preferably comprises one or more client computers 102(1)–(N) coupled together to form a local area network or LAN 104. Client computers 102 include any type of computing device, such as a personal computer, handheld computer, or the like. The LAN 104 is coupled to a modem 106 that in turn couples to a service provider managed network 114 and the Internet 116. In the preferred embodiment, the modem 106 is a DSL (Digital Subscriber Line) modem that couples to a Digital Subscriber Line Access Multiplexer (DSLAM) 112, which is a network device that is usually located at a telephone server operator's central office 110. The DSL modem 106 preferably couples to the DSLAM 112 over regular telephone lines [POTS (plain old telephone service) lines]. The DSLAM 112, in turn, couples to the service provider managed network 114 and the Internet 116 in a manner well understood in the art. The service provider managed network 114 is preferably an ATM (Asynchronous Transfer Mode) network. It should be understood that DSL technology is only one way of connecting to the Internet 116. DSL technology is used for its speed of communication and accessibility to users' homes over regular telephone lines. In alternative embodiments of the invention, cable modem technology, satellite technology, or the like may be utilized as long as the modem described is used.

The service provider managed network 114 also couples to the service provider system 146. The service provider system 146 preferably comprises a service provider's DNS server 120, a VPN Provider 118, and an HTTP (Web) server 160 containing administration HTTP (Web) pages 162, an example of which is shown in FIG. 6. The administration HTTP (Web) pages 162 may alternatively be stored on a Value Added Network Services (VANS) database 128. Use of the DNS server 120 will be explained below in relation to FIG. 5.

The VPN Provider 118 is an important part of the VPN infrastructure. Based on commands and information entered into administration Web pages 162 by remote corporate VPN system administrators, the VPN Provider 118 dispatches instructions to configure and control the modem 106 and a VPN concentrator 136 (described below) and manage their security policies. The VPN concentrator 136 is a device that combines several communications channels into one and is often used to tie multiple terminals together into one line. The VPN Provider 118 also transmits certificate and private keys from a security generator, such as a Public Key Infrastructure (PKI) synchronizer 124, where keys are numeric codes that are combined in some manner with communicated data to encrypt it for security purposes. The corporate administration Web-pages 162 are preferably unique for each server operator and only allow administration of VPN concentrators 136 resident at the server-side system locations 130, and users that access such server-side systems 130.

The VPN Provider 118 is preferably coupled to an OSS (Operational Support System) 122, a Public Key Infrastructure (PKI) synchronizer 124, a VPN synchronizer 126, a Value Added Network Services (VANS) database 128, and a modem synchronizer or cache farm 148. In addition to its usual functions, the OSS 122, also, preferably controls online ordering and billing of VPN services.

Although PKI is preferably used to secure the communications, any suitable alternative security mechanism may be used. PKI enables users of an unsecured public network, such as the Internet, to securely and privately exchange data through the use of public and private cryptographic key pairs that are obtained and shared through a trusted authority. PKI provides for Digital Certificates that can identify individuals or organizations. A Digital Certificate is an electronic "credit card" that establishes a sender's credentials. It is issued by a certification authority (CA) 150, and contains the senders name, a serial number, expiration dates, a copy of the certificate holder's public key (used for encrypting and decrypting messages and digital signatures), and the digital signature of the certificate-issuing authority so that a recipient can verify that the certificate is real. The PKI synchronizer 124 consists of: a certificate authority (CA) 150 that issues and verifies Digital Certificates, where each certificate includes the public key or information about the public key; a registration authority (RA) 152 that acts as the verifier for the CA before a Digital Certificate is issued to a user; and one or more directories 154 where the certificates (with their public keys) are held. Although not shown, a certificate management system may also be provided.

As the Root CA the PKI processes PEM (Privacy Enhanced Mail) encoded PKCS #10 (Public-Key Cryptography System) Digital Certificate requests and return Certificates in the PKCS #7 format, where the Root CA is the parent authority that all CAs trust. As an additional function the PKI generates private and public key pairs. The public key is used for certificate creation, while the private key, once it has been sent to and received by the modem, is deleted from the PKI. The PKI requires an API (Application Program Interface) that can be called by the VPN Provider to control the PKI functions such as process a certificate request, etc. The PKI also needs to support revoking certificates with a minimum of issuing CRL's (Certificate Revocation List).

The VPN Synchronizer 126 is used to serve security data via the VPN provider to the VPN Concentrator 136, while the modem synchronizer or cache farm 148 is used to serve security data via the VPN provider to the modem 106.

The VANS database 128, provides the features that allow management of the entire VPN. The VANS database contains the security policies and certificates for the modem 106 and the VPN Concentrators 136. For example, for each pair of client-server VPN tunnels set up, a security policy for each modem and each VPN Concentrator 136 is stored in the VANS database 128. The VANS database preferably contains server location information, network information, or the like. The network information preferably includes DNS server 144 addresses, authentication server 138 addresses, WINS (Windows Internet Naming Service) server IP addresses, default corporate network subnets, encryption and authentication algorithms, user's configuration information (locations, additional corporate subnets allowed to connect to), or the like.

The server-side system 130 preferably consists of a router 132 coupled to a firewall 134 and a VPN concentrator 136. The firewall 134 and VPN concentrator 136 are coupled to a local area network or LAN 156. The LAN 156 couples an authentication server 138, a file server 140, a proxy server 142, and the server operator's DNS server 144 to one another.

The router 132 is a device or, in some cases, software in a computer, that determines the next network point to which a packet should be forwarded toward its destination. The router 132 is coupled to at least two networks, namely the Internet 116 and the LAN 156, and decides which way to send information packets based on its current understanding of the state of the networks it is connected to.

The firewall 134 is a set of related programs located at the server-side system 130, that protects the resources of the LAN 156 from users connected to the Internet 116. The firewall 134 also works with the proxy server 142 to make network requests on behalf of corporate workstation users (not shown). The firewall is preferably installed on a computer separate from the rest of the LAN 156 so that no incoming request can access private network resources. Alternatively, the firewall 134 may form part of another computer, such as the router 132 or VPN Concentrator 136. There are a number of firewall screening methods that may be used in conjunction with the invention. One such method is to screen requests to make sure they come from acceptable (previously identified) IP addresses. In the present invention, the firewall 134 allows remote access to the private LAN 156 by the use of secure logon procedures and authentication certificates, explained below.

In use, a VPN tunnel is constructed between the modem 106 and the VPN concentrator 136, which acts as a server and responds to VPN session requests. In the preferred embodiment of the invention, the VPN concentrator 136 conforms to IETF IKE (Internet Engineering Task Force— Internet Key Encryption) and IPSec (Internet Protocol Security) standards and provides as a minimum DES (Data Encryption Standard) and/or 3DES (Triple Data Encryption Standard (168 Bit)) encryption and HMAC-MD5 (Hashed Message Authentication Code-Message Digest 5) and/or HMAC-SHA1 (Hashed Message Authentication Code-Secure Hash Algorithm 1) authentication algorithms. The VPN concentrator also preferably supports multiple concurrent IPSec tunnels and is fully compatible with authentication and encryption software, such as the HIFN IKE and IPSec Toolkits 238 that are shown and described in relation FIG. 2. The IKE Security negotiation authenticates the sender and receiver using standard X.509v3 Digital Certificates. An example of a suitable VPN concentrator is made by RED-CREEK COMMUNICATIONS™, Inc., and is configured by controlling and pushing configuration details to RED-CREEK'S E-DIRECTOR™ (ReD) server.

The authentication server 138 is used to authenticate a VPN session request from the modem 106. In the preferred embodiment of this invention, the authentication server 138 is a RADIUS (Remote Authentication Dial-In User Service) server. RADIUS is client/server protocol and software that enables clients to remotely communicate with a central server that authenticates users and authorizes their access to the requested system or service. RADIUS allows a server operator to maintain user profiles in a central database, preferably on the authentication server 138, that all remote servers can share. RADIUS also provides enhanced security, allowing a server operator to set up a policy that can be applied at a single administered network point. Having a central service also means that it is easier to track usage for billing and for keeping network statistics. RADIUS client software is preferably also located on the modem 106, such that data packets sent by the modem 106 are RADIUS formatted. An example of suitable RADIUS software is "Funk Steel Belted RADIUS™" made by FUNK SOFTWARE™, Inc.

The file server 140 is used to serve files requested by a user to a client computer 102. The proxy server 142 is a server that acts as an intermediary between the LAN 156 and the Internet so that the server operator can ensure security, administrative control, and caching service. One function of the proxy server 142 is to accept securely formatted packets (preferably RADIUS formatted packets) from the modem's security software 226 (FIG. 2) (preferably RADIUS software) and proxy the request to the authentication server 138.

In a preferred embodiment the proxy server uses open source software, such as CISTRON RADIUS SERVER VERSION 1.6.3™, and is modified to accept RADIUS packets from client computers 102 without client configuration. Optionally, OEM Radius software (Funk Steel Belted Radius™) which can operate in promiscuous mode, can be used that has the additional advantage of having the capability of authenticating against a MICROSOFT NT™ Domain or NOVELL NDS™. Promiscuous mode is the condition in which a node in a network recognizes and accepts all packets on the line regardless of protocol type or destination. Use of the server operator's DNS server 144 will be explained in detail below in relation to FIG. 5.

It should be appreciated that the functions of the various devices shown in FIG. 1 can be provided by separate devices or software, or combined in a single device or software package. Furthermore, different procedures can be resident in different, or the same computers. For example, the proxy server 142 may be in the same computer as the firewall 134 or it may be on a separate computer.

Figure 2:
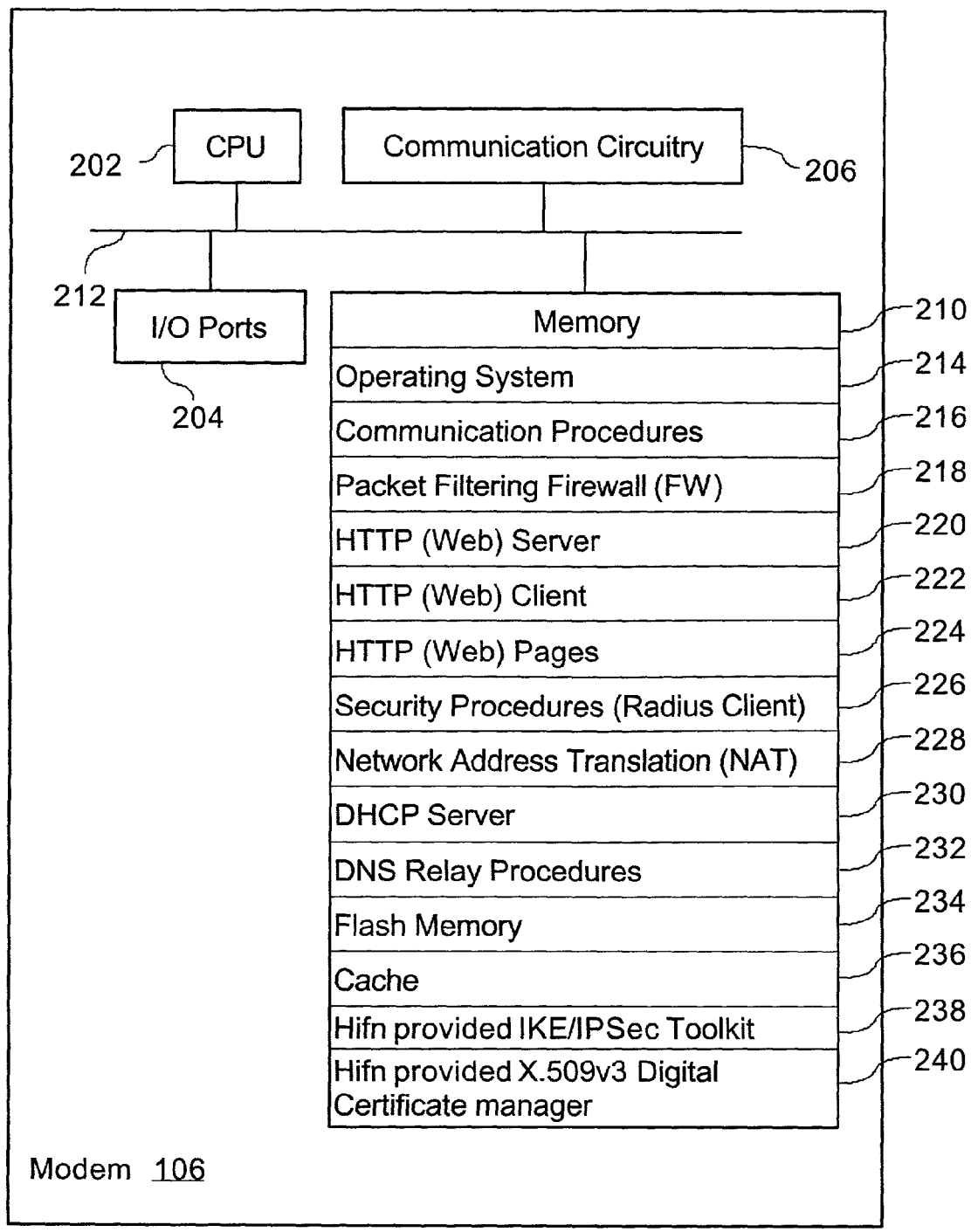
FIG. 2 is a block diagram of the modem shown in FIG. 1.
Figure 3A:
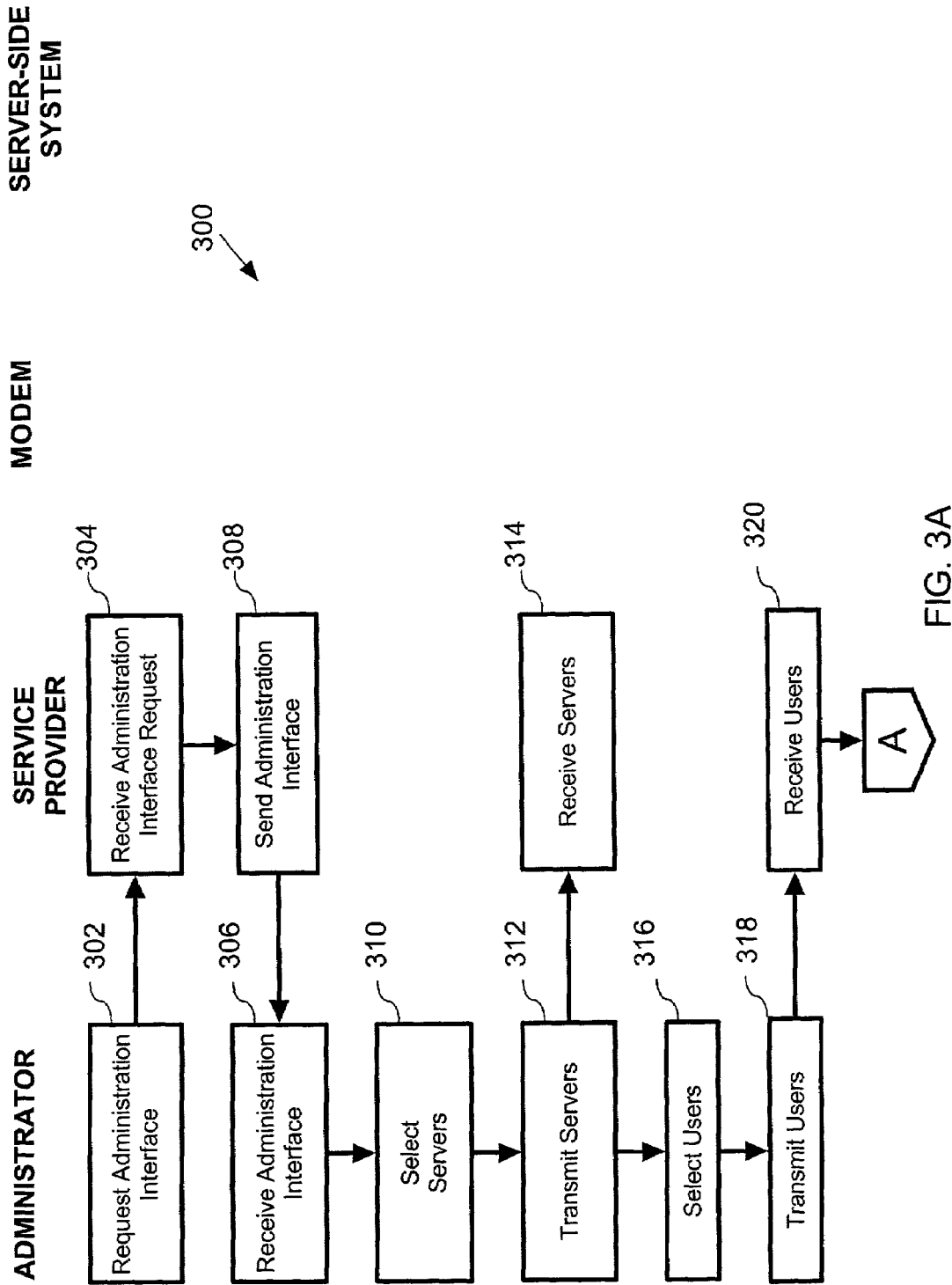
FIGS. 3A–D are flow charts of a method for automatically configuring a VPN according to an embodiment of the invention.
Figure 3B:
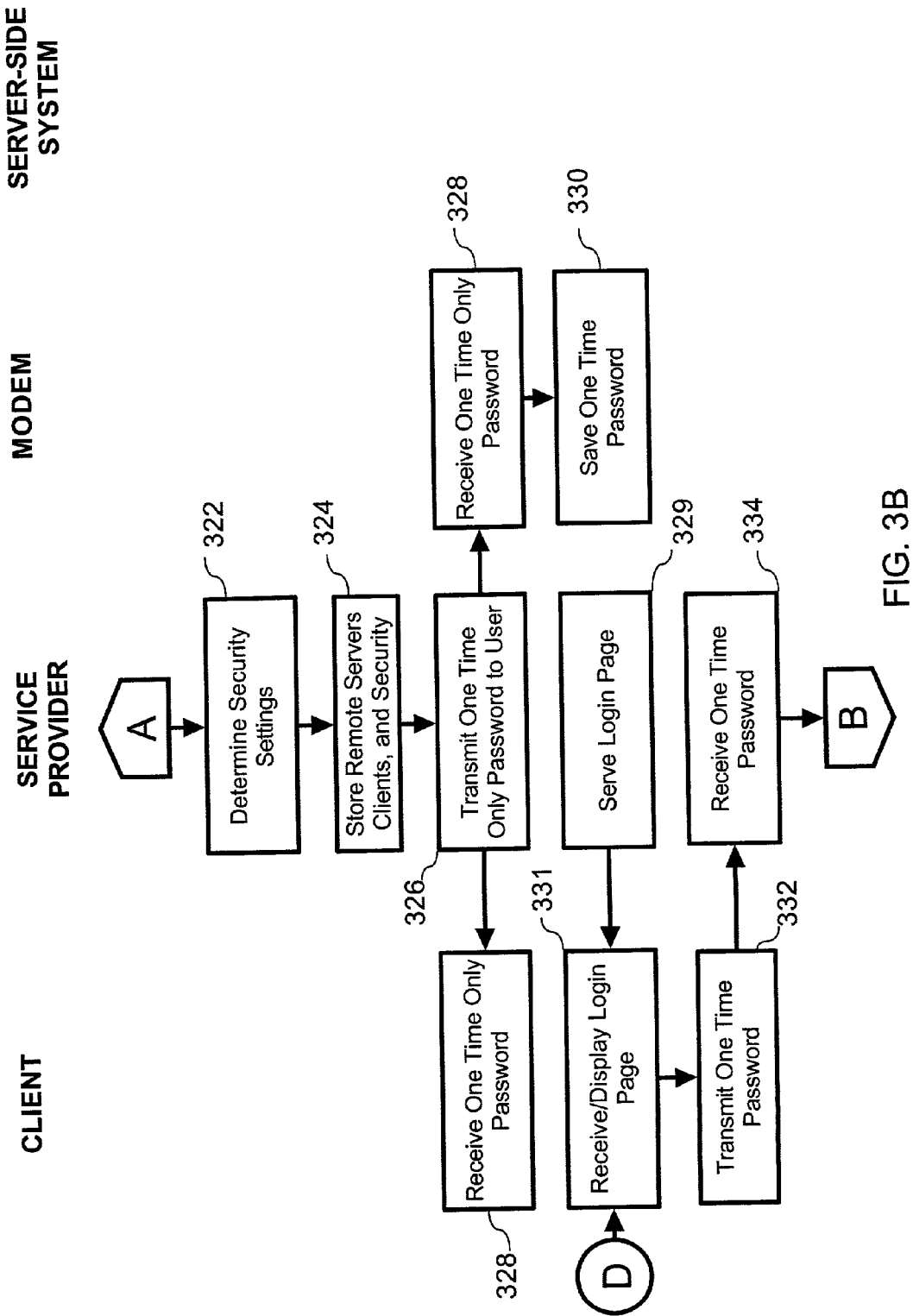
Figure 3C:
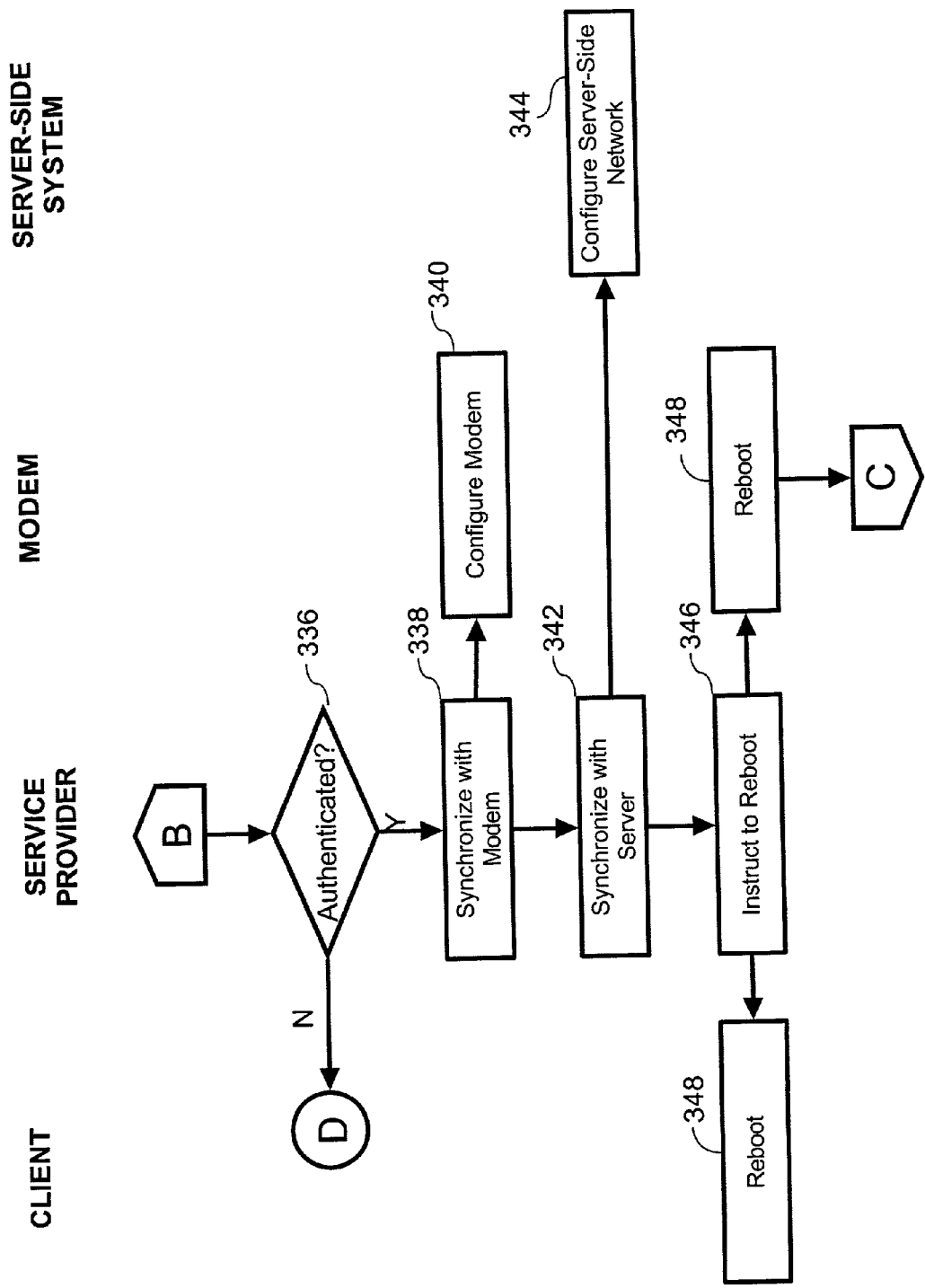
Figure 3D:
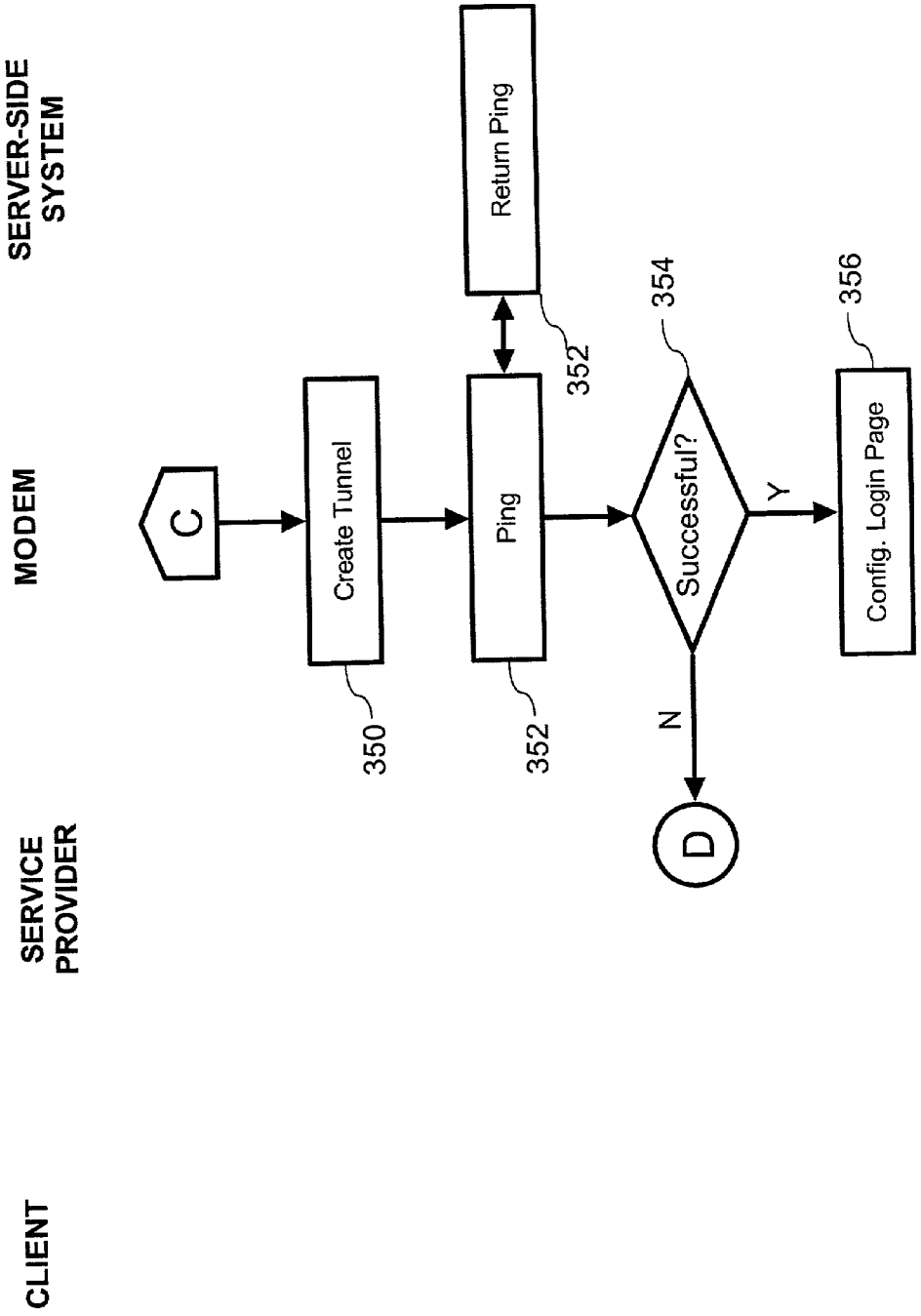

FIG. 2 is a block diagram of the modem 106 shown in FIG. 1. Modem 106 preferably includes at least one data processor or central processing unit (CPU) 202; a memory 210; communication circuitry 206; input and output ports 204; and at least one bus 212 that intercouples these components. Memory 210 preferably stores an operating system 214 (such as VXWORKS™ made by Wind River Systems Inc., or EMBEDDED LINUX a free Unix-type operating system), having instructions for communicating, processing, accessing, storing, or searching data, etc. Memory 210 also preferably includes communication procedures 216; a packet filtering firewall (FW) 218; an HTTP (Web) server 220; an HTTP (Web) client 222; HTTP (Web) pages 224; security procedures (Radius client) 226; Network Address Translation (NAT) 228; a DHCP (Dynamic Host Configuration Protocol) server 230; DNS relay procedures 232; a flash memory 234; a cache 236; an IKE/IPSec Toolkit 238, such as that made by HI/FN, Inc; and a Digital Certificate manager 240, such as a X.509v3 Digital Certificate manager made by HI/FN, Inc.

Communication procedures 216 are used for communicating with the service provider system 146 (FIG. 1), the server-side system 130 (FIG. 1), and the client-side local LAN 104 (FIG. 1). The packet filtering firewall (FW) 218 protects the resources of the client-side LAN 104 (FIG. 1) from users connected to other networks. The HTTP (Web) server 220 serves HTTP (Web) pages 224 to users of the client computers 102 (FIG. 1). One such Web page is a user login page with fields for entering security data, such as a username and password. The HTTP (Web) client 222 requests Web pages from the Internet 116 (FIG. 1)and preferably utilizes Digital Certificates and supports SSL (Secure Sockets Layer).

The security procedures 226 enable the client computers 102 (FIG. 1) to communicate with the server-side system 130 (FIG. 1), authenticate VPN users, and authorize user access to the requested servers. As discussed above, the preferred security procedures 226 utilize RADIUS client software. The security procedures 226 are used to proxy the user's authentication request to the corporate proxy server 142 (FIG. 1). An authentication reply from the authentication server 138 (FIG. 1) determines whether access to the server-side system 130 is granted. As explained in greater detail in relation to the description of FIG. 4 below, if a valid authentication response is received by the modem 106 (FIG. 1), encrypted packets can be communicated between a client computer and the server-side system. The security procedures 226 preferably conform to RFC (Request for Comments) 2138.

Network Address Translation (NAT) 228 is used to translate Internet Protocol addresses (IP addresses) used within one network, preferably the LAN 104 (FIG. 1), to different IP addresses known within another network, preferably the Internet 116 (FIG. 1). Therefore, NAT maps the LAN IP addresses to one or more global IP addresses and unmaps the global IP addresses of incoming packets back into LAN IP addresses. This helps ensure security since each outgoing or incoming request must go through a translation process that also offers the opportunity to qualify or authenticate the request or match it to a previous request. NAT also conserves on the number of global IP addresses used by the modem 106 (FIG. 1).

Therefore, the VPN effectively extends the server-side system 130 (FIG. 1) to a user's home client computer. This requires the user's client computer to either use a corporate assigned IP address that is assured to be unique and can be routed within the server-side system, or to use a private non-routable IP address and through Network Address Translation (NAT), assume a corporate assigned IP address. If NAT is used, many applications that include IP address information in the IP payload may not work. Some examples of these applications are NETMEETING™, RPC™, NT-LANMAN™ authentication, ICQ™, etc. The VPN system supports a number of scenarios. If the server operator assigns private non-routable IP address blocks for all user's utilizing the VPN (ex. 10.250.0.0), then the assigned IP block must be unused throughout all the server-side system locations. The VANS sub-system 122, 150, 126, 128, and 148 (FIG. 1)will allocate a subnet for each user from the assigned IP blocks. The modem's DHCP server 230 (FIG. 2) is configured to offer the subnet to the client computers 102 (FIG. 1). Alternatively, if the server operator assigns a global static IP address to each modem, the modem uses a one-to-one NAT to make each client computer appear to be sourced by the static IP address. For example, for the configuration of two client computers connected behind the modem with IP addresses of 10.6.1.3 and 10.6.1.4 with only the client computer with an IP address of 10.6.1.3 connecting to a server operator with the subnet of 3.0.0.0 and using a server operator assigned IP address of 3.1.100.3 these are the sample NAT rules:

map atm0 10.6.1.0/24→216.217.40.5/32 map atm0 10.6.1.3/32→3.1.100.3/32

[Where 3.1.100.3 is the corporate assigned IP address which is part of the corporate address space, 216.217.40.5 is internal modem IP address and atm0 is the modem virtual interface. Packets destined for the Internet will be NATed to 216.217.40.5 and packets from 10.6.1.3 destined for the server-side system will be NATed to 3.1.100.3.]

The DHCP server 230 lets network administrators manage centrally and automate the assignment of Internet Protocol (IP) addresses to the client computers 102 (FIG. 1) in the LAN 104 (FIG. 1). Using the Internet's set of protocols (TCP/IP), each client 102 (FIG. 1) that can connect to the Internet 116 (FIG. 1) is assigned a unique IP address. Without DHCP, the IP address must be entered manually at each computer and, if computers move to another location in the LAN, a new IP address must be entered. The DHCP server 230 lets a network system administrator supervise and distribute IP addresses from a central point and automatically send a new IP address when a computer is plugged into a different place in the network.

The DNS (Domain Name System) relay procedures 232 allows the user's client computer 102 (FIG. 1) to resolve IP addresses within the private corporate-side LAN 156 (FIG. 1), and resolve Internet domain names into IP addresses.

The flash memory 234 is a type of constantly-powered nonvolatile memory that can be erased and reprogrammed in units of memory called blocks. In the preferred embodiment of the invention, the following is stored in the flash memory 234: The Root CA Certificate, Sub CA Certificate, EW Certificate (Use for connecting to all server-side systems), EW Private Key, EW Password, VPN Security Policy (One set for every server operator, each user may connect to several server operators in different locations which the modem will be allowed to connect to), Cached Log information, and Login/Status Web page.

The cache 236 is a temporary storage memory. The HIFN™ provided IKE/IPSec Toolkit 238 and HIFN™ provided X.509v3 Digital Certificate management 240 are software products provided by HI/FN, Inc.™, which are used to implement IPSEC (Internet Protocol Security) and IKE (Internet Key Encryption).

Turning now to the configuration of the VPN system between a server operator 130 and a remote user 108. The server operator firstly enters into an agreement for DSL service, including VPN, from a service provider 146. A VPN concentrator 136 (FIG. 1) is provided to the server operator, and the server operator is given a code which is entered when the user sign up for DSL service. The service operator is also given a web client Digital Certificate, an HTTP administration URL (Uniform Resource Locator) that the server operator can use to access and administer their VPN system, and an administrator username and password used to login to the administrator Web page, as explained below in relation to FIG. 6. The code is used to determine which server operator a user is associated with. This information is passed on to the user by the server operator. By logging on to the service provider's Web page, the user can preferably request DSL and VPN service by entering the code, their telephone number, name and address, etc. Subsequently, a modem is supplied to the user, which the user preferably connects to a phone line and at least one client computer 102 (FIG. 1). A browser link on the client computer is used to access login Web-pages located on the modem. The modem automatically configures, and the system administrator instructs the VPN system, via an administration Webpage, to supply VPN service to the user. The system automatically configures the VPN system and the server operator is billed.

Moreover, the modem is preferably configured to send and receive data traffic directly to and from the Internet, while only server operator side data traffic is sent and received through the VPN tunnel. If a modem does not have this feature, all data traffic must first be sent through the VPN tunnel to the server operator, and thereafter the data traffic destined for the Internet passed through the server operator network firewall.

FIGS. 3A–D are flow charts of a method 300 for automatically configuring a VPN according to an embodiment of the invention. A VPN system administrator, such as a corporate IT administrator, requests (step 302) an administration interface from the service provider. The service provider receives (step 304) the request for the administration interface and sends (step 308) the administration interface to the administrator. The administration interface is preferably the administration Web page 162 (FIG. 1) stored on the service provider's Web server 160 (FIG. 1), an example of which is shown in FIG. 6. Although not shown, secure login is preferably provided so that only the administrator can log into his server operator's VPN administration system. The administrator then receives (step 306) the administration interface, preferably containing a list of users and corporate servers, and selects (step 310) the corporate servers to add to the VPN system. The selected corporate servers are then transmitted (step 312) to the service provider who receives (step 314) the selection. The administrator then selects (step 316) the users that he would like to add to the VPN system. The selected users are then transmitted (step 318) to the service provider who receives (step 320) the selected users. In an alternative embodiment, selected servers and users may be transmitted simultaneously.

The VPN provider 118 (FIG. 1) then accesses the PKI synchronizer 124 (FIG. 1) to determine (step 322) the security settings for the VPN, using standard security means, such as digital certificates. In the preferred embodiment, the security settings are obtained as follows. A public and private key are created simultaneously using an algorithm by the certificate authority (CA) 150 (FIG. 1). The private key is given only to the requesting party and the public key is made publicly available (as part of a Digital Certificate) in a directory that all parties can access. The private key is never shared with anyone or sent across the Internet. The private key is used to decrypt text that has been encrypted with the public key by the sender. In addition to encrypting messages (which ensures privacy), authentication can also be provided by using the private key to encrypt a Digital Certificate.

The selected corporate servers, users, and security settings are then stored (step 324) in the VANS database 128 (FIG. 1). A one-time only password is subsequently transmitted (step 326) to the new user. The user, using one of the client computers 102 (FIG. 1), and the modem, receives (step 328) the one time only password, which is stored in the modem's flash memory 232 (FIG. 2). When the user is ready to log on to the VPN system for the first time, the user requests a one-time only login page which is stored as one of the Web pages 222 (FIG. 2) on the modem. The Web server 220 (FIG. 2) on the modem then serves (step 329) the one-time only login page to the user's web browser on the client computer. The onetime only login page is received and displayed (step 331) on the client computer. The user enters the one time only password, which is transmitted (step 332) to the service provider. The service provider, more specifically the VPN provider 118 (FIG. 1) receives (step 334) the one time password and passes the one time password to the PKI Synchronizer 124 (FIG. 1). If authentication of the one time password is successful (step 336—Yes), the service provider automatically (cache farm/modem synchronizer 148) configures (step 338 and 340) the modem with the saved security settings. The service provider (VPN Synchronizer) may also, at this time, automatically configure (step 342 and 344) the server-side system 130 (FIG. 1) with the security settings. Configuration of the server-side system preferably entails configuration of the authentication server 138 (FIG. 1) and the firewall 134 (FIG. 1). If authentication of the one time password is not successful (step 336—No), the one-time only login page is again displayed (step 331) on the client computer, and the user is again prompted to enters the one time only password.

To synchronize (step 340) the security settings with the modem, the modem preferably downloads a set of VANS Product URLs, which are pointers to the real security settings. The VPN Product URLs include a download VPN configuration URL, a download modem firewall configuration URL, a renew and download modem PKI certificates URL, and a report VPN operational test result URL. The modem connects to the VPN URLs, authenticates using the cached one time password, and downloads the VPN configuration from the VANS database 128 (FIG. 1). The VPN Configuration preferably includes VPN security policy(ies), a private key and certificate, and a root CA certificate. The modem stores the VPN security policy(ies), and private key and certificates in its flash memory 232 (FIG. 2). The modem then preferably configures its DHCP server 234 (FIG. 2) for DNS server IP address; WINS server IP address; and assigned corporate IP subnet.

The user is then instructed (step 346), preferably via a Web page, to reboot the client computer. The user then reboots (step 348) the client computer and the modem. The modem, for each VPN Security Policy, then preferably performs an operational test where a VPN tunnel is created (step 350) and the internal port of the VPN Concentrator 136 (FIG. 1) is pinged (step 352). If the operational test is successful (step 354—Yes), the VPN login page (one of the Web pages 224 (FIG. 2) on the modem) is enabled and configured (step 256). If the operational test is not successful (step 354—No), then the user is prompted to re-enter the one time password, which is again transmitted (step 332) to the service provider.

The above described method addresses the manual configuration drawbacks associated with current VPNs, as it is less complex, more efficient, and less costly than current VPN systems. In addition, the resources of service providers can be redirected to areas other than manually configuring the system. Using the above described method, VPN service providers can eliminate sending out technicians to server operators and users to configure their systems. This leads to tremendous cost savings for the service provider and the server operator. Further benefits can be brought about by allowing multiple users to establish distinct VPNs using the same modem. These further benefits are described below in relation to FIGS. 4A–C.

Figure 4A:
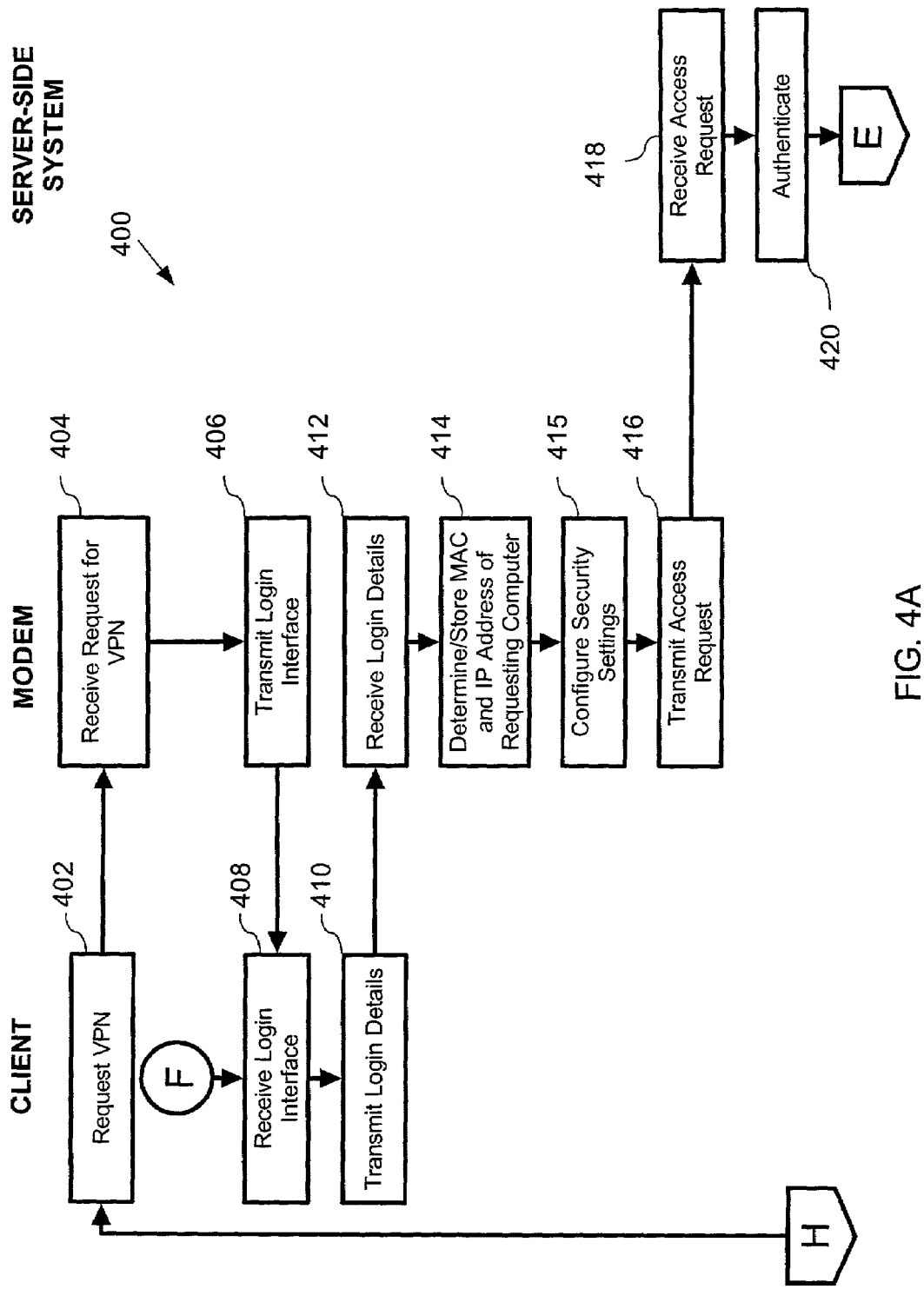
Figure 4C:
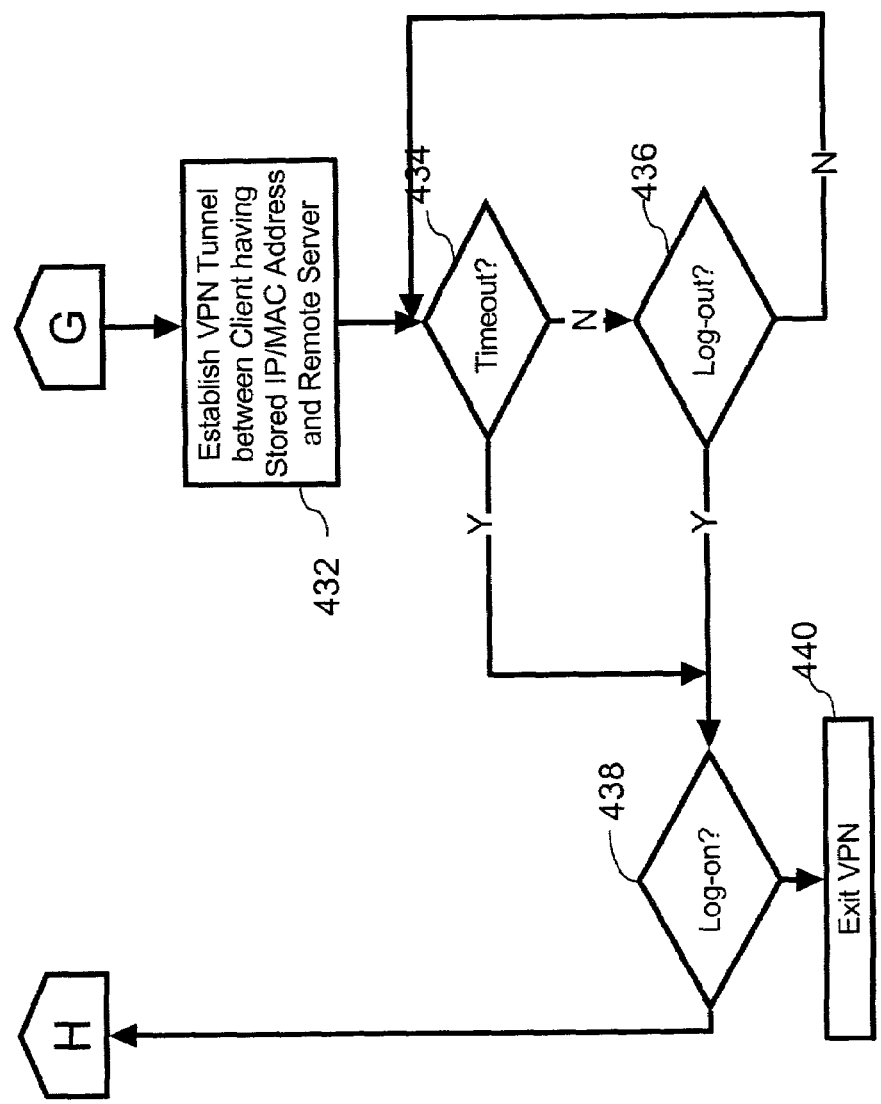

FIGS. 4A–C are flow charts of a method 400 for establishing multiple VPN tunnels over a single modem. The user or corporate employee, preferably using a Web browser on one of the client computers 102 (FIG. 1), requests (step 402) the initiation of a VPN session. The request is received (step 404) by the modem 106 (FIG. 1). All routes which point to the tunnel are cleared. A login interface is then transmitted (step 406) to the client computer from where the request originated. The login interface is preferably a Web page 224 (FIG. 2) stored on the modem 106 (FIG. 2), and is preferably served by the Web server 220 (FIG. 2). The login interface is received (step 408) by the client. The user enters a username and password and, from a list of server operators and/or servers, selects the location to connect to. In the preferable embodiment, a SecurID token is also entered by the user, where SecurID technology guards against unauthorized access by providing dynamic user authentication via a randomly generated one-time code that automatically changes every 60 seconds, which provides substantially greater security than traditional password systems. A location is listed for each VPN security policy resident on the modem, i.e., each server-side system 130 (FIG. 1). These login details are then transmitted (step 410) to the modem's Web server 220 (FIG. 2), which receives (step 412) the login details. The MAC address and/or IP (Internet Protocol) address of the client computer from where the request came, is determined and stored (step 414) in the modems flash memory 232 (FIG. 2). The MAC address is a unique serial number burned into Ethernet and Token Ring adapters that identifies that network card from all others. Determination of the Mac or IP address is preferably accomplished by reading the connection log for the modem Web server 220 (FIG. 2) to extract which host IP address made the request. The modem then configures (step 415) its security settings. Configuration of the security settings depends on the encryption standards used.

In the preferred embodiment, configuration of the security settings occurs using standard IPSec implementation. The IPSec stack is configured with the server operator server's VPN Security Policy (VPN Concentrator IP address, authentication method, IKE and IPSec authentication and encryption algorithms, Diffie-Hellman Group, key lifetime). The security procedures 226 (FIG. 2), preferably a Radius Client, is configured with details such as shared secret, Radius server IP address, port, etc. If a static IP address has been assigned to the modem, then the NAT (Network Address Translation) table 228 (FIG. 2) is configured (one to one NAT using IP address for Location). The firewall 218 (FIG. 2) is configured to allow for communications in both directions. A modem certificate is added, as well as a private key and CA Root certificate to the ISAKMP Cache. IKE Phase 1 mode is established with the VPN Concentrator where the modem authenticates using its Digital Certificate to the VPN Concentrator, and Security Association (SA) is established between the modem and the VPN Concentrator. IKE Phase II negotiates IPSec SA. IPSec Tunnel is established based on SA. A route is added for connecting to the authentication server 138 (FIG. 1).

Subsequently, the security procedures 226 (FIG. 2) on the modem, preferably a Radius Client, transmits (step 416) an access request, which is received (step 418) by the authentication server 138 (FIG. 1). The authentication server then attempts to authenticate (step 420) the request. A response is formulated and transmitted (step 422) to the modem, which receives the response (step 424). The response may be either access accepted, access challenged, or access-rejected.

If access is rejected (step 426—Yes) then a Web page, from the stored Web pages 222 (FIG. 2) on the modem, displaying such rejection is displayed (step 427) to the user and the user is allowed to re-enter and re-transmit (step 410) the login details, such as a username and password. If access is challenged (step 428—Yes), then a Web page, from the stored Web pages 222 (FIG. 2) on the modem, displaying such challenge is displayed (step 427) to the user and the user is allowed to re-enter and retransmit (step 410) the login details, preferably only the password.

If access is accepted (step 430—Yes), then a VPN tunnel is established (step 432) between the client having the stored IP or MAC address and the server-side system. This is preferably accomplished by adding routes from the connecting client to the corporate subnets through a virtual interface. If split-tunneling is not allowed then the routes to the Internet are removed and the default route is set to the VPN Concentrator. Login details are stored in a log file, which is periodically pushed to the VANS database 128 (FIG. 1) by the modem. The modem then starts a connection timer and monitors communication traffic.

After a successful authentication, firewall rules are added to the packet filtering firewall 218 (FIG. 2) to allow full access to the server-side system from only the client computer from where the VPN request originated. For example:

add 210 allow ip from aaa.aaa.aaa.aaa to bbb.bbb.bbb.bbb via dsl0 add 220 allow ip from bbb.bbb.bbb.bbb to aaa.aaa.aaa.aaa via dsl0

Where aaa.aaa.aaa.aaa is the Telecommuter's PC IP address, bbb.bbb.bbb.bbb is the corporate subnet and dsl0 is the modem's virtual interface.

If no traffic is detected for a length of time defined by the VPN system administrator, there is a system timeout (step 434), the tunnel is torn down and a disconnect message is displayed, where the user has the option to re-log on (step 438). The user may, also, at any point, choose to log out (step 436) of the VPN. Again the user is given the option to re-log on (step 438). If the user decides not to re-log on, he or she is logged out of the system (step 440). In this way security is protected by dropping the VPN should the user not be using the VPN for a predetermined length of time. Therefore, if a user forgets to disconnect from the VPN and leaves the client computer unsecured, the VPN will automatically be dropped after a length of time determined by the VPN system administrator.

Should other users, using any of the remainder of the client computers 102 (FIG. 1) also require the formation of distinct VPNs with other, or the same, server-side systems, they may login in the same manner as described above, where distinct VPNs are formed in the same manner as explained above. Security of the multiple VPNs is not compromised, because each VPN is only established between the client computer where login occurred and the corporate VPN associated with the user's unique login details. This is accomplished, as explained above, by restricting communication of each VPN to a single client computer having a previously established and stored IP or MAC address. Each VPN is then formed only between the server-side system selected by a user and the client computer from where login occurred.

Security mechanisms used in a preferred embodiment of the invention may be generally described as follows:

1. Upon receiving instructions from the corporate administrator Web interface the VPN service for a user can be suspended or deleted. If suspended then the VPN Provider 118 (FIG. 1) will instruct the modem 106 (FIG. 1) to suspend VPN service. Any on-going IPSec session is stopped and no new IPSec sessions can be initiated. If deleted then the modem's Digital Certificate is revoked and the VPN Provider will contact the modem with instructions to delete its certificate and disable VPN service.

2. The VPN Concentrator will only allow an IKE/IPSec connection from a VPN client (modem) with a valid Digital Certificate that can be authenticated by the issuing Certificate Authority 150 (FIG. 1). The authentication works as follows:

i. During the first phase of ISAKMP, a packet containing the modem X.509v3 Digital Certificate signed by a Root CA is passed from the modem to the VPN Concentrator. The VPN Concentrator authenticates the Root CA signature in the certificate using the CA public key. Then the VPN Concentrator uses the modem's public key to validate the modem signature in the certificate.

ii. During the next phase of ISAKMP, the opposite happens. The VPN Concentrator X.509v3 Digital Certificate signed by the same Root CA is passed from the VPN Concentrator to the modem. The modem authenticates the Root CA signature in the certificate using the CA public key. Then the modem uses the VPN Concentrator's public key to validate the VPN Concentrator signature in the certificate.

iii. The session key used to encrypt traffic between devices is generated using a Diffie-Heilman cryptographic technique that enables sending and receiving parties to exchange public keys in a manner that derives a shared, secret key at both ends. Using a common number agreed by both sides, both sides use a different random number, which is their individual private key, as a power to raise the common number. The results become their private keys and are sent to each other. The receiving party raises the received number to their own private keys, and the results are the same on both sides. Further details can be found in U.S. Pat. No. 4,200,770 to Hellman et al., the description of which is hereby incorporated by reference. The Diffie-Hellman technique generates the session key on the modem device using a public exposed value from the VPN Concentrator and a unique private value on the modem. The Diffie-Hellman algorithm generates the identical session key on the VPN Concentrator device using a public exposed value from the modem and a unique private value on the VPN Concentrator.

iv. The session key can now be used with a block cipher such as DES or 3DES to encrypt information between the devices.

3. The modem will not initiate an IPSec connection to the VPN concentrator until a user's username, password, and token-number has been proxied in an Access-request message via a Radius Proxy server to a corporate Radius server and an Access-accept response is received back. Then the modem can initiate an IPSec connection and add the routes to the server-side system to its routing table. Also, the modem firewall rules are added to allow only traffic from the user's client computer to the server-side system.

The above described method addresses the difficulties associated with establishing multiple VPNs over a single modem, leading to tremendous cost and efficiency benefits. Two separate modems connecting to the Internet using separate DSL connections is no longer required. Further cost and efficiency benefits can be attained by addressing the difficulties associated with resolving host names in a VPN. These further benefits are described below in relation to FIGS. 5A–C.

Figure 5A:
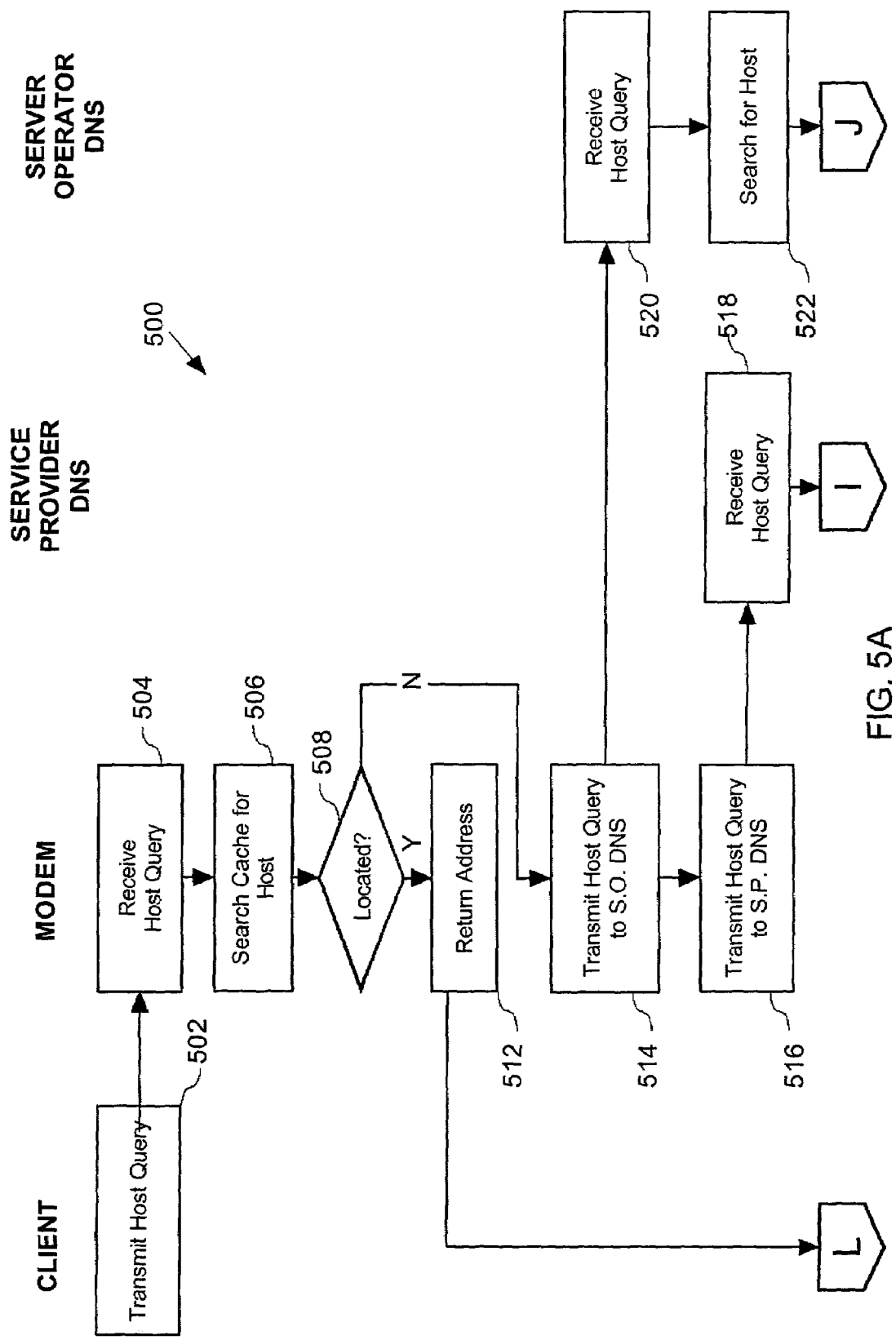
Figure 5B:
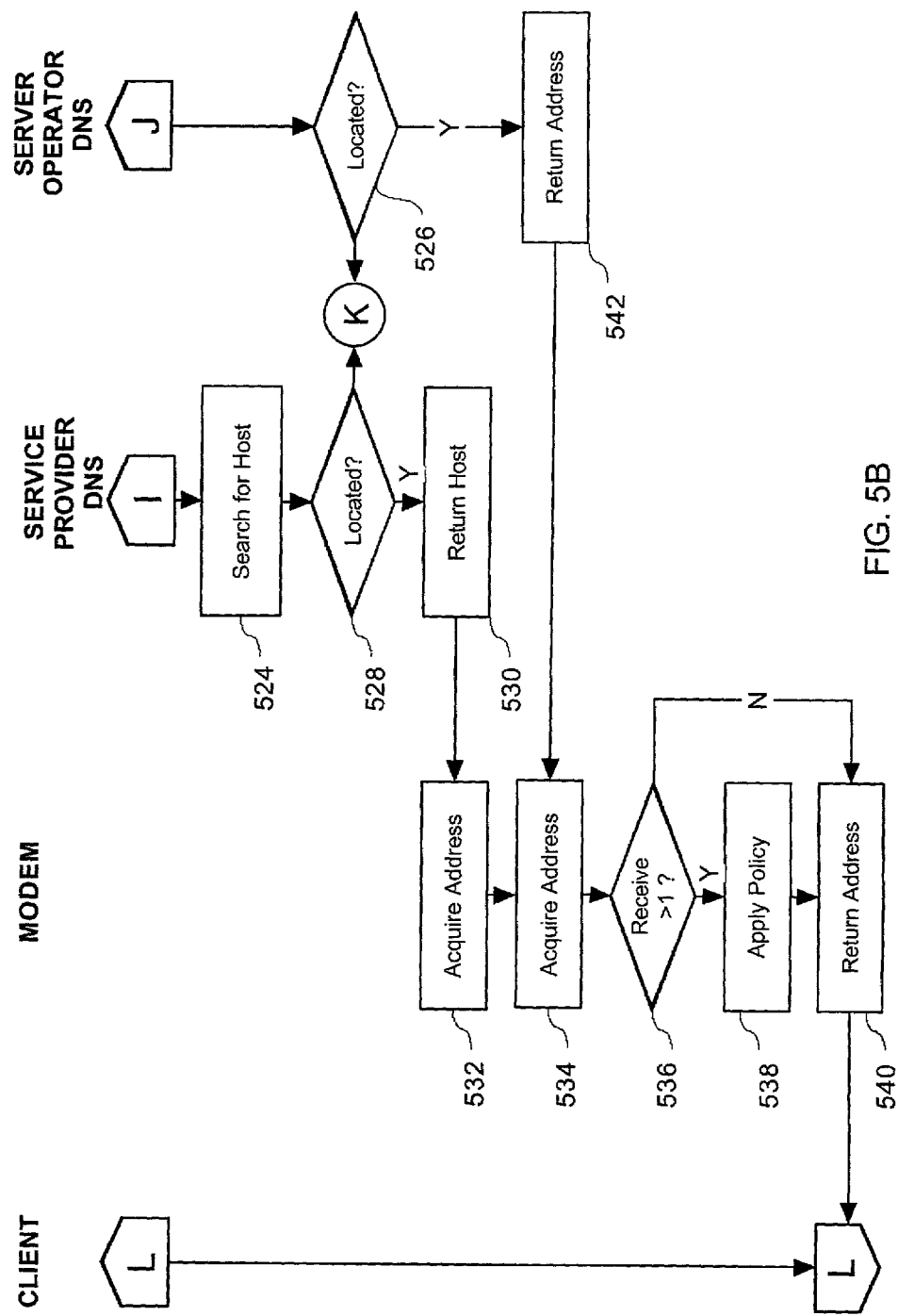
Figure 6:
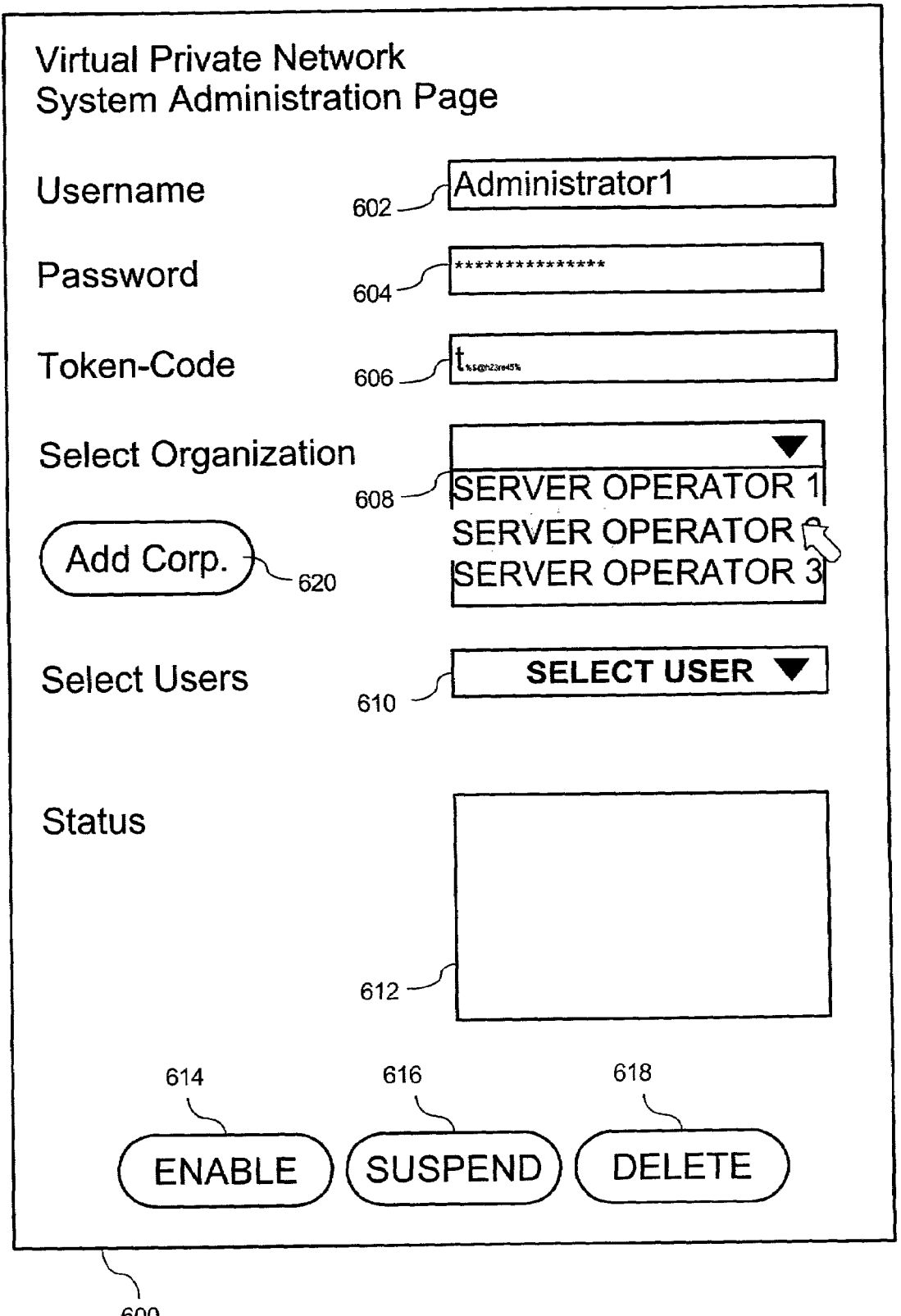
FIG. 6 is a Graphical User Interface (GUI) of a VPN system administration Web page.

FIG. 5A–C are flow charts 500 of a method for automatically resolving host names in a VPN with multiple DNS servers, according to an embodiment of the invention. Typically, when a server-side system 130 (FIG. 1) is behind an Internet firewall, a split DNS (internal/external) is operated for the corporate domain, i.e., a separate internal corporate DNS server 144 (FIG. 1) and a separate external service provider DNS server 120 (FIG. 1) coexist on the VPN. The internal server operator DNS server contains all the server-side system's IP address which are private, and the external service provider DNS server contains all the IP address which are public.

With VPNs, the problem arises as to which DNS server the client computer communicates with, to resolve host names. The DNS Relay procedures 232 (FIG. 2) on the modem must, therefore, be able to relay DNS queries for the Internet domains to the service provider's DNS servers 120 (FIG. 1), while relaying DNS queries for the corporate domains to the internal corporate DNS server 144 (FIG. 1).

To accomplish the above, the user's client computer DNS server settings, usually accessible from the Browser, are set to the internal IP address of the modem. Once a user requests a host, such as by typing "www.company.com" into the text or address box of his Internet browser, the client computer 102 (FIG. 1) transmits (step 502) the host query to the modem 106 (FIG. 1). The modem receives the query (step 504) and searches (step 506) its local cache 236 (FIG. 2) for a host corresponding to the requested host.

If the modem locates the host in the cache (step 508—Yes), the located host address is returned (step 512) to the client computer, which receives (step 542) the host address. Alternatively, if a cached version of the requested page is located, the page itself will be returned to the client computer and displayed to the user. If a host address is returned (step 512) to the client computer, then the client computer formulates a new request for content, and sends (step 544) it to the host address. The request is preferably a HyperText Markup Language (HTML) request for content such as a Web page or file.

If the host is not located in the cache (step 508—No), the host query is transmitted to all DNS servers set up in the modem. In the preferred embodiment, the host query is transmitted (step 514) to the server operator's DNS Server 144 (FIG. 1), and is transmitted (step 516) to the service provider's DNS Server 120 (FIG. 1). Once the host request is received (steps 520) by the server operator's DNS server, the server searches (step 522) for the host's associated address, which is preferably the host's IP address. Likewise, once the host request is received (steps 518) by the service provider's DNS server, the server searches (step 524) for the host's associated address, which is preferably the host's IP address. It should be noted that if fewer, or more, DNS servers are provided, they too will be sent the host request and they too will search for the host's associated address.

If the server operator's DNS server locates (step 526—Yes) the host's associated address, the address is returned (step 542) to the modem. If the server operator's DNS server does not locate (step 526—No) the host's associated address, the server operator's DNS server transmits (step 546) a "No Host Found" message to the modem.

Likewise, if the service provider's DNS server locates (step 528—Yes) the host's associated address, the address is returned (step 530) to the modem. If the service provider's DNS server does not locate (step 528—No) the host's associated address, the service provider's DNS server transmits (step 546) a "No Host Found" message to the modem.

Once the modem acquires (steps 532 and 534) the address from the service provider's DNS server and/or the server operator's DNS server, the modem determines (step 536) whether it has received more than one address, i.e., an address from both the service provider's DNS server and the server operator's DNS server. If only one address is received (step 536—No), then the address is returned (step 540) to the client computer. If more than one address is received (step 536—Yes), then the modem applies (step 538) a policy to the received addresses, so as to be left with only a single address. In the preferred embodiment the policy keeps only the most recent address. Alternatively, the policy may always return the address supplied by the service provider. Once the policy has been applied and only one address remains, that address is returned (step 540) to the client computer.

Once the client computer receives (step 542) the address, it formulates a request for content, such as an HTML request for a Web page, and sends (step 544) the request to the received address. Therefore, if for example a host request for "www.company.com" returns a request from both the service provider's and the server operator's DNS servers, the policy preferably returns either the latest IP address for "www.company.com" or returns the IP address from the service provider's DNS server, such as 216.32.74.10. The client computer then sends a request to 216.32.74.10, which returns the company's Web page. The above method, therefore, resolves host names in a VPN with multiple DNS servers.

The above method may also be used by the service provider to control the use of the search engine, most likely page, and results list returned when a user enters text into the text box that cannot be resolved. If neither of the DNS servers can resolve the host name, they transmit (step 546) a "No Host Found" message to the modem. The modem receives (step 548) the message and instructs a search engine dictated by the service provider, or alternatively by the VPN system administrator, to conduct a search based on the unlocated host name. Once the search (step 550) is completed, the search results are transmitted (step 552) to the client computer. Once the client computer receives (step 554) the results, they are displayed (556) to the user. In this way, the service provider and/orVPN system administrator can control the search results displayed to the user. For example, the VPN system administrator can set up the system so that when text is entered into the text box by a user, and no host address can be resolved from the text, the results of a search of the server operator's web site, using the text as the search term, can be displayed to the user. Furthermore, the service provider can generate revenue from displaying advertiser's Web pages more prominently on a list of search results. In an alternative embodiment, if the DNS servers do not respond at all, or do not respond within a predetermined time, the modem automatically conducts the search.

Moreover, the above method may also be used to resolve host addresses for devices coupled to the VPN. Users using a file manager, such as WINDOWS EXPLORER™, or an Internet browser, such as MICROSOFT'S INTERNET EXPLORER™, in conjunction with more recent versions of MICROSOFT WINDOWS™, can resolve the host name of devices, or directories on these devices, coupled to the VPN. For example, if the host query entered into the text box of the GUIs of the above applications was for "ComputerName" the modem would attempt to locate a device, or directories on a device, that matched the entered name. The modem would send the host name to both DNS servers and if a device, or directories on a device, on the VPN matches "ComputerName," return the address of that device.

The above described method addresses the drawbacks associated with current DNS systems, while allowing a service provider to specify which search engine is to be used if a name cannot be resolved.

FIG. 6 is a Graphical User Interface (GUI) of a VPN system administration Web page 600. It should be noted any user interface that performs the same function as Web page 600 may be used to administer a VPN. The VPN system administration Web page 600 comprises fields for entering a username 602, a password 604, and a SecurID token-code 606. An organization menu 608, preferably a drop down menu, is provided for allowing the VPN system administrator to select the server-side systems 130 (FIG. 1) to which VPN service will be provided. A users menu 610, preferably a drop down menu, is provided for allowing the VPN system administrator to select the users to which VPN service will be provided. Users are preferably listed alphabetically. Alternatively, two user menus may be provided, one for current active users and one for new users requesting VPN service.

For each user the administrator can enable 614, suspend 616, or delete 618 VPN service. Also, for each user the administrator can select organization configuration (may belong to multiple organizations) and for each organization enter IP address to use, list additional network subnets allowed to connect to, specify security level used (set of IKE and IPSec Authentication and Encryption algorithms, Diffie-Hellman key size, etc.), specify split tunneling (On/Off).

A status box 612 is provided where the administrator can view the connection status, who the VPN Concentrator is connected to, the last connection time, the total usage, the bytes transferred, the time on-line, the encryption/authentication algorithms used, certificate information, or the like The administrator can also preferably add new server operator details by clicking on button 620. New details may include a VPN Concentrator IP address, a VPN Concentrator type, a secondary VPN Concentrator IP address, a secondary VPN Concentrator type, a Radius Server IP address, a secondary Radius Server IP address, the security level encryption/authentication, a Radius Shared Secret, a list of network subnets allowed to connect to, or the like.

In the case where a user reports a lost or stolen modem, the VPN administrator can notify the service provider of the loss, preferably through the administrator Web-site. This causes NRMS (Network Resource Management System) on the OSS to revoke the modem's certificates, disable VPN service for this modem, and delete the modem's policy configuration on the VPN Concentrator. Because of the nature of a DSL connection, and because the modem interoperates with the NMS and with it's saved configuration, the modem can only be operated from the user's phone line, and, therefore, cannot be used to connect to the corporate network from another DSL phone line.

The above methods provide a VPN service which fulfills the requirements of network security and access control, while from the user and administrator's perspective is very easy to install, configure and manage.

While the foregoing description and drawings represent the preferred embodiment of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description. Furthermore, it should be noted that the order in which the process is performed may vary without substantially altering the outcome of the process.

What is claimed is:

1. A computer implemented method for remotely configuring a Virtual Private Network (VPN) between a client-side system and a server-side system, comprising:
   receiving data at a service provider system indicative of a selected server-side system and a selected client-side system between which a VPN is to be established;
   automatically determining security settings at the service provider system for said client-side system based at least partially on said data; and
   automatically transmitting VPN configuration details from the service provider system to a modem of said client-side system, where said VPN configuration details include said security settings,
   such that in use said modem of said client-side system is automatically configured with said VPN configuration details to establish a secure VPN tunnel between said client-side system and said server-side system.

2. The computer implemented method of claim 1, wherein said receiving comprises obtaining said data indicative of a selected server in said server-side system and a selected user of said client-side system from a system administrator, via an electronic network.

3. The computer implemented method of claim 1, wherein said determining comprises creating a public and private key.

4. The computer implemented method of claim 1, wherein said determining comprises establishing a Digital Certificate.

5. The computer imnplementcd method of claim 1, further comprising:
   automatically ascertaining further security settings for said server-side system;
   automatically transmitting VPN configuration details to a concentrator within said server-side system, where said VPN configuration details include said further security settings.

6. The computer implemented method of claim 1, further comprising:
   automatically ascertaining further security settings for said server-side system; and
   automatically transmitting VPN configuration details to a firewall within said server-side system, where said VPN configuration details include said further security settings.

7. The computer implemented method of claim 1, wherein said transmitting comprises communicating said VPN configuration details to said modem within said client-side system.

8. The computer implemented method of claim 1, wherein said transmitting comprises communicating said VPN configuration details to a firewall on said modem within said client-side system.

9. The computer implemented method of claim 1, further comprising the step, after said determining step, of: storing said data indicative of a selected server-side system and a selected client-side system between which a VPN is to be established and said security settings.

10. The computer implemented method of claim 1, further comprising the steps, after said automatically transmitting step, of:
    receiving a password from said client-side system; and
    authenticating said password.

11. The computer implemented method of claim 1, further comprising:
    establishing a Virtual Private Network tunnel between said client-side system and said server-side system; and
    verifying that said tunnel is operational.

12. The computer implemented method of claim 1, further comprising configuring a login page on said modem within said client-side system.

13. A computer program product for use in conjunction with a computer system for remotely configuring a Virtual Private Netwotic (VPN) between a client-side system and a server-side system, the computer program product comprising a computer readable storage and a computer program stored therein, the computer program comprising:
    instructions for receiving data at a service provider system indicative of a selected server-side system and a selected client-side system between which a VPN is to be established;
    instructions for automatically determining security settings for a modem of said client-side system based at least partially on said data; and
    instructions for automatically transmitting VPN configuration details from said service provider system to said modem of said client-side system, where said VPN configuration details include said security settings, such that in use said modem of said client-side system is automatically configured with said VPN configuration details.

14. The computer program product of claim 13, wherein said instructions for receiving further comprise instructions for obtaining said data indicative of a selected server in said server-side system and a selected user of said client-side system from a system administrator, via an electronic network.

15. The computer program product of claim 13, wherein said instructions for determining further comprise instructions for creating a public and private key.

16. The computer program product of claim 13, wherein said instructions for determining further comprise instructions for establishing a Digital Certificate.

17. The computer program product of claim 13, wherein said computer program further comprises:
    instructions for automatically ascertaining further security settings for said server-side system; and
    instructions for automatically transmitting VPN configuration details to a concentrator within said server-side system, where said VPN configuration details include said further security settings.

18. A computer implemented method for remotely configuring a Virtual Private Network (VPN) between a client-side system and a server-side system, comprising:
    receiving at a modem within said client-side system, VPN configuration details from a service provider system, where said VPN configuration details include security settings for establishing a VPN with a remote server-side system; and
    automatically configuring said modem, with said VPN configuration details, such that in use a secure VPN tunnel can be established between said client-side system and said server-side system.

19. The computer implemented method of claim 18, wherein said configuring further comprises setting-up a firewall on said modem with said modem with said security settings.

20. The computer implemented method of claim 18, further comprising:
receiving a password from said client-side system; and
authenticating said password.

21. The computer implemented method of claim 20, wherein said authenticating comprises:
sending said password to an authentication server within said server-side system;
receiving authentication from said authentication server.

22. A remotely configurable Virtual Private Network (VPN) comprising:
a client-side network comprising:
a modem that communicates with the internet; and
at least one client computer electrically coupled to said modem;
a server-side network comprising:
a VPN concentrator that communicates with the internet; and
at least one server electrically coupled to said VPN concentrator; and
a service provider network comprising:
a security generator for automatically determining security settings used to secure VPN communication between said client computer and said server;
a VPN synchronizer for automatically configuring said modem with said security settings; and
a modem synchronizer for automatically configuring said modem with said security settings.

23. The remotely configurable Virtual Private Network (VPN) of claim 22, wherein said modem is a DSL (Digital Subscriber Line) modem.

24. The remotely configurable Virtual Private Network (VPN) of claim 22, wherein said server-side network further comprises:
a router configured to electrically couple to the internet;
a firewall electrically coupled to said router;
an anthentication server for authenticating a user of said client computer;
a file server;
a proxy server; and
a DNS (Domain Name System) server.

25. The remotely configurable Virtual Private Network (VPN) of claim 22, wherein said server-side network further comprises an authentication server for authenticating a user of said client computer.

26. The remotely configurable Virtual Private Network (VPN) of claim 22, wherein said service provider network further comprises:
a VPN provider;
a DNS (Domain Name System) server, and
an HTTP server.

27. The remotely configurable Virtual Private Network (VPN) of claim 22, wherein said security generator is a PKI (Public Key Infrastructure) Synchronizer.

* * * * *